(12) United States Patent
Carmein et al.

(10) Patent No.: US 8,779,404 B2
(45) Date of Patent: *Jul. 15, 2014

(54) ELECTRO-HYDRODYNAMIC WIND ENERGY SYSTEM

(71) Applicant: Accio Energy, Inc., Ann Arbor, MI (US)

(72) Inventors: David Carmein, Ann Arbor, MI (US); Dawn White, Ann Arbor, MI (US)

(73) Assignee: Accio Energy, Inc., Ann Arbor, MI (US)

( * ) Notice: Subject to any disclaimer, the term of this patent is extended or adjusted under 35 U.S.C. 154(b) by 19 days.

This patent is subject to a terminal disclaimer.

(21) Appl. No.: 13/932,972

(22) Filed: Jul. 1, 2013

(65) Prior Publication Data

US 2013/0285376 A1  Oct. 31, 2013

Related U.S. Application Data

(63) Continuation of application No. 13/333,797, filed on Dec. 21, 2011, now Pat. No. 8,502,181, which is a continuation of application No. 12/357,862, filed on Jan. 22, 2009, now Pat. No. 8,421,047.

(60) Provisional application No. 61/011,701, filed on Jan. 22, 2008.

(51) Int. Cl.
*G01N 21/85* (2006.01)

(52) U.S. Cl.
USPC ............. 250/573; 250/283; 250/288; 290/43; 290/44; 310/52; 310/308; 310/311; 322/2 A; 322/2 R; 322/35

(58) Field of Classification Search
USPC ............ 250/283, 288, 573; 310/308, 311, 52; 322/2 A, 2 R, 35; 290/43, 44
See application file for complete search history.

(56) References Cited

U.S. PATENT DOCUMENTS

| 414,943 A | 11/1889 | Dewey |
| 911,260 A | 2/1909 | Pennock |

(Continued)

FOREIGN PATENT DOCUMENTS

| DE | 639000 | 11/1936 |
| DE | 19629417 A | 2/1998 |

(Continued)

OTHER PUBLICATIONS

D. Djairam "The Electrostatic Wind Energy Converter, Electrical Performance of a High Voltage Prototype", pp. 1-173. Doctoral Dissertation, Dec. 10, 2008. http://repository.tudelft.nl/view/ir/uuid:e1cfdada-85ea-45c4-b6e4-b798abf5917 e/.

(Continued)

*Primary Examiner* — Georgia Y Epps
*Assistant Examiner* — Kevin Wyatt
(74) *Attorney, Agent, or Firm* — Jeffrey Schox; Diana Lin

(57) ABSTRACT

A system for electro-hydrodynamically extracting energy from wind includes an upstream collector that is biased at an electric potential and induces an electric field. An injector introduces a particle into the electric field. The wind drag on the particle is at least partially opposed by a force of the electric field on the particle. A sensor monitors an ambient atmospheric condition, and a controller changes a parameter of the injector in response to a change in the atmospheric condition.

25 Claims, 29 Drawing Sheets

(56) References Cited

U.S. PATENT DOCUMENTS

| | | | |
|---|---|---|---|
| 1,014,719 A | 1/1912 | Pennock | |
| 2,638,555 A | 5/1953 | Marks | |
| 3,121,196 A | 2/1964 | Kasemir | |
| 3,191,077 A | 6/1965 | Marks et al. | |
| 3,411,025 A | 11/1968 | Marks | |
| 3,489,669 A | 1/1970 | Ruhnke | |
| 3,518,461 A | 6/1970 | Marks | |
| 3,792,293 A | 2/1974 | Marks | |
| 3,960,505 A | 6/1976 | Marks | |
| 4,073,516 A | 2/1978 | Kling | |
| 4,146,371 A | 3/1979 | Melcher et al. | |
| 4,146,800 A | 3/1979 | Gregory et al. | |
| 4,206,396 A | 6/1980 | Marks | |
| 4,271,357 A | 6/1981 | Bradshaw et al. | |
| 4,395,648 A | 7/1983 | Marks | |
| 4,417,293 A | 11/1983 | Larigaldie | |
| 4,433,248 A | 2/1984 | Marks | |
| 4,450,364 A | 5/1984 | Benoit | |
| 4,486,669 A | 12/1984 | Pugh | |
| 4,523,112 A | 6/1985 | Marks | |
| 4,581,675 A | 4/1986 | Kelly | |
| 4,667,100 A | 5/1987 | Lagna | |
| 5,047,892 A | 9/1991 | Sakata et al. | |
| 5,125,230 A | 6/1992 | Leonard | |
| 5,214,386 A | 5/1993 | Singer et al. | |
| 5,273,838 A | 12/1993 | Draper et al. | |
| 5,912,396 A | 6/1999 | Wong | |
| 6,254,034 B1 | 7/2001 | Carpenter | |
| 6,440,600 B1 | 8/2002 | Starzak | |
| 6,452,499 B1 | 9/2002 | Runge et al. | |
| 6,462,337 B1 | 10/2002 | Li et al. | |
| 6,544,484 B1 | 4/2003 | Kaufman et al. | |
| 7,405,672 B2 * | 7/2008 | Taylor et al. | 340/629 |
| 7,478,712 B2 | 1/2009 | Mccowen | |
| 7,855,476 B2 | 12/2010 | Ogram | |
| 8,102,082 B2 | 1/2012 | Ogram | |
| 8,283,811 B2 | 10/2012 | Ogram | |
| 2002/0060631 A1 | 5/2002 | Runge et al. | |
| 2002/0153006 A1 | 10/2002 | Zimlich et al. | |
| 2003/0218855 A1 | 11/2003 | Goldenberg | |
| 2004/0089156 A1 | 5/2004 | Gartstein et al. | |
| 2004/0129931 A1 | 7/2004 | Asryan et al. | |
| 2004/0134997 A1 | 7/2004 | Khain et al. | |
| 2004/0164241 A1 | 8/2004 | Farnsworth et al. | |
| 2004/0179322 A1 | 9/2004 | Pletcher et al. | |
| 2006/0061107 A1 * | 3/2006 | Cadaret | 290/44 |
| 2007/0114381 A1 | 5/2007 | Jackson | |
| 2007/0216316 A1 | 9/2007 | Hirano et al. | |
| 2008/0063577 A1 | 3/2008 | Crowe et al. | |
| 2008/0073530 A1 | 3/2008 | Jolliffe et al. | |
| 2008/0199195 A1 | 8/2008 | Swift et al. | |
| 2008/0308095 A1 | 12/2008 | Trees et al. | |
| 2008/0309087 A1 | 12/2008 | Evulet et al. | |
| 2009/0218910 A1 | 9/2009 | Carmein et al. | |
| 2009/0314850 A1 | 12/2009 | Kampmeyer | |
| 2010/0018850 A1 | 1/2010 | Adhvaryu et al. | |
| 2010/0127624 A1 | 5/2010 | Roy | |
| 2010/0156444 A1 | 6/2010 | Ponjee et al. | |
| 2011/0050080 A1 | 3/2011 | Suzuki et al. | |
| 2013/0015257 A1 | 1/2013 | Kalra et al. | |

FOREIGN PATENT DOCUMENTS

| | | |
|---|---|---|
| DE | 10360876 A | 9/2005 |
| GB | 0909232 | 7/2009 |
| WO | 2009094441 A | 7/2009 |
| WO | 2010127178 A | 11/2010 |

OTHER PUBLICATIONS

D. Djairam et al. "The Development of an Electrostatic Wind Energy Converter (EWICON)" 2005 International Conference on Future Power Systems High Voltage Technol. & Manage. Group, Delft Univ. of Technol. Dec. 2005; DOI: 10.1109/FPS.2005.204208 ISBN: 90-78205-02-4.

* cited by examiner

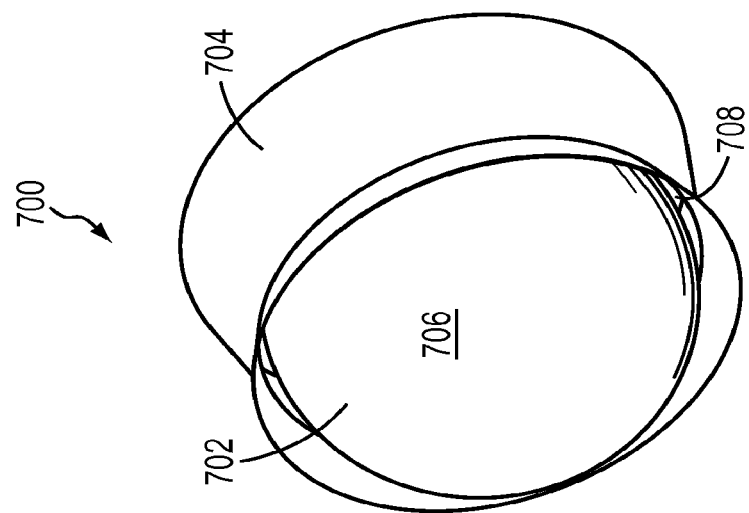
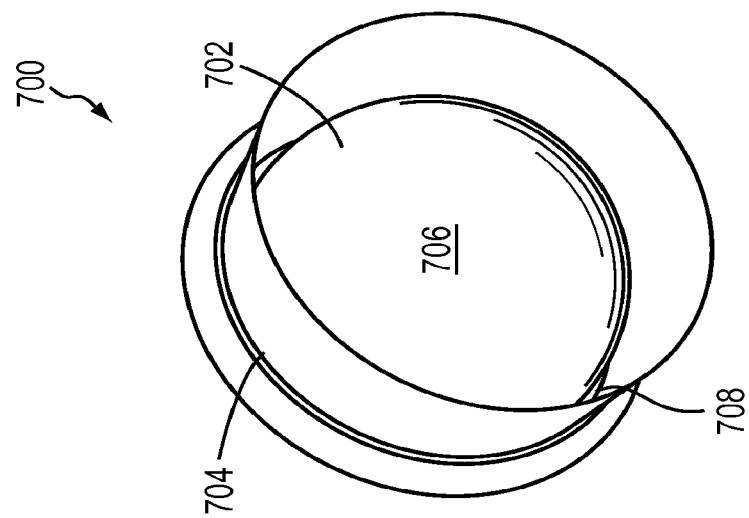
FIG. 7B
FIG. 7A

FIG. 21

ELECTRO-HYDRODYNAMIC WIND ENERGY SYSTEM

CROSS-REFERENCE TO RELATED APPLICATIONS

This application claims priority to and the benefit of U.S. Provisional Patent Application Ser. No. 61/011,701, filed on Jan. 22, 2008 by David Carmein; U.S. Provisional Patent Application Ser. No. 61/066,650, filed on Feb. 22, 2008 by David Carmein; and U.S. Provisional Patent Application Ser. No. 61/199,598, filed on Nov. 18, 2008 by David Carmein and Dawn White, each entitled Electro-Hydrodynamic Wind Energy System and each of which are hereby incorporated herein by reference in their entirety.

TECHNICAL FIELD

In various embodiments, the present invention relates to systems and methods for electro-hydrodynamic wind energy and, more specifically, converting wind energy directly into electrical energy.

BACKGROUND

Electro-hydrodynamic ("EHD") wind energy conversion ("WEC") is a process wherein electrical energy is extracted directly from wind energy. Just as flakes of snow may be driven by the wind to create a "current" of snowflakes, so too may wind be hydrodynamically coupled to charged species to create a true electrical current in free space. The generated current may be connected to an electrical circuit by means of an electrostatic field to perform useful work.

EHD systems exhibit a number of advantages over conventional wind turbines. For example, conventional wind turbines have a maximum allowable wind speed beyond which their blades, mechanical components, and electrical generating equipment may be damaged. Once this maximum wind speed, or "cut-out" speed, is reached, the wind turbine's blades may begin to furl in order to avoid damage to the turbine. Typical cut-out speeds for small turbines are approximately 28 mph (12.5 m/s). Medium and large turbines may cut out at approximately 60 mph (26.8 m/s).

EHD systems, however, are solid-state devices, with no rotating machinery, shafts, bearings, gears, lubrication oil, brakes, equipment housing, and the like. Thus, EHD systems have no furling speed, and may continue to generate energy from wind even at high wind velocities. Furthermore, even though some large conventional turbines may have a high furling speed, conventional turbines may not produce more than their rated power. Consequently, their power curve is substantially flat above the furling speed, whereas EHD power continues to rise with increasing wind velocity.

At low or medium wind velocities, however, traditional EHD systems are inefficient, and may not generate as much energy as it takes to run them. For example, EHD systems require energy to create the charged species and, in the case of liquid-based charge carriers, energy to pump the liquid and hydraulically pressure spray it to create small diameter particles. Furthermore, traditional EHD systems are expensive, and may not be cost-effective at any wind velocity.

Clearly, a need exists for a cost-effective EHD system that is capable of generating net positive energy at a wide range of wind velocities.

SUMMARY

Embodiments of the present invention include systems and methods for increasing the efficiency of EHD systems while simultaneously lowering their cost. For example, a control system may be used to monitor ambient environmental conditions such as wind speed, wind direction, temperature, and humidity, and adjust parameters of the EHD in response to increase or maximize the energy extracted from the wind. In certain embodiments, various diffusers and/or airfoils may be used to increase the ambient wind velocity. Alternatively or additionally, MEMS devices may be used to create charged particles more efficiently than traditional means. Various applications may place the EHD systems in areas of consistently high wind speed, such as at high altitudes.

In general, in one aspect, a system for electro-hydrodynamically extracting energy from wind includes, an upstream collector biased at an electric potential. The electric potential induces an electric field, and an injector introduces a particle into the electric field. Wind drag on the particle is at least partially opposed by a force of the electric field on the particle. A sensor monitors an ambient atmospheric condition, and a controller changes a parameter of the system in response to a change in the atmospheric condition.

One or more of the following features may be included. The particle may carry an electric charge. The atmospheric condition may be ambient wind speed, temperature, pressure, and/or humidity. The parameter of the system may be particle size, electric charge per particle, particle flow rate, electric potential, electric field strength, and/or a separation between the upstream collector and electrical ground.

The system may further include a downstream collector, which may be larger than the upstream collector. The particle may be a droplet of a liquid, and may include a solid particle and/or a low-volatility liquid. The injector may be an electrospray injector, and may include a Taylor cone, a MEMS device, a metal needle, a plastic needle, plastic tubing, and/or a dielectric-barrier discharge device. The particle may be an ion.

The system may further include a shaped structure for increasing wind speed within the electric field. The controller may respond to changes in the atmospheric condition in real time.

In general, in another aspect, a method for electro-hydrodynamically extracting energy from wind begins with the step of biasing an upstream collector at an electric potential. The electric potential induces an electric field, and particles are injected into the electric field. Wind drag on the particles is at least partially opposed by a force of the electric field on the particles. An ambient atmospheric condition is monitored, and a parameter related to at least one of the particles and the electric field is changed in response to a change in the atmospheric condition.

One or more of the following features may be included. The atmospheric condition may be ambient wind speed, temperature, pressure, and/or humidity. The parameter may be particle size, electric charge per particle, particle flow rate, electric potential, electric field strength, and/or a separation between the upstream collector and electrical ground.

The particles may be collected with a downstream collector. Each particle may be a droplet of a liquid and the step of injecting may include injecting the droplet with an electrospray injector. The droplet of liquid may include a solid particle and/or a low-volatility liquid. The step of injecting may further include forming a Taylor cone. Wind speed may be increased within the electric field. The step of changing the parameter may occur in real time.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations.

BRIEF DESCRIPTION OF THE DRAWINGS

The objects and features of various aspects and embodiments of the invention can be better understood with reference to the schematic drawings described below, and the claims. The drawings are not necessarily to scale, emphasis instead generally being placed on illustrating the principles of the invention. In the drawings, like reference characters generally refer to the same parts throughout the different views. In the following description, various embodiments of the present invention are described with reference to the following drawings, in which:

FIGS. 5-7B illustrate diffusion bodies in accordance with embodiments of the invention;

Figure 21:
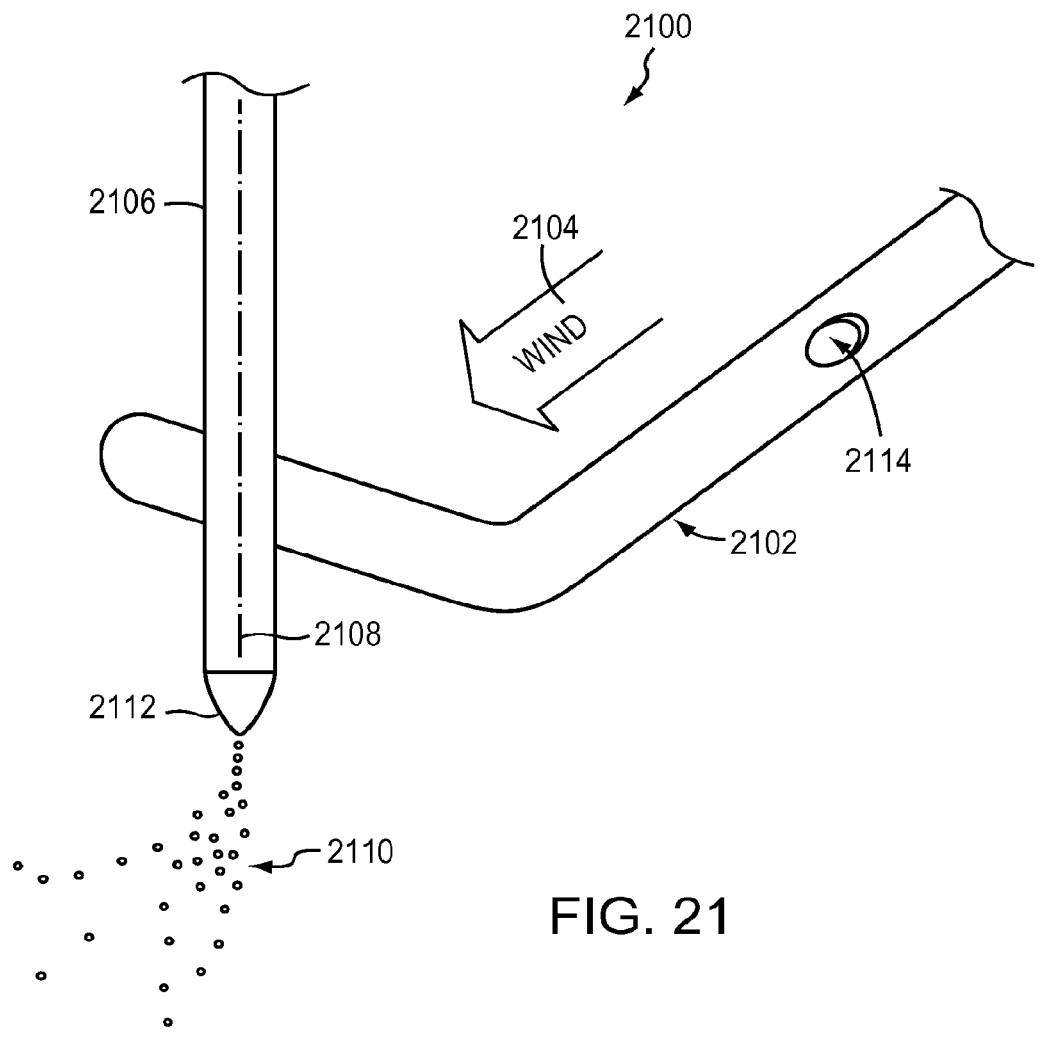

FIG. 21 illustrates an asymmetric EHD electrode in accordance with one embodiment of the invention;

FIGS. 26A-30 illustrate lighter-than-air EHD systems in accordance with embodiments of the invention.

DETAILED DESCRIPTION

Figure 1:
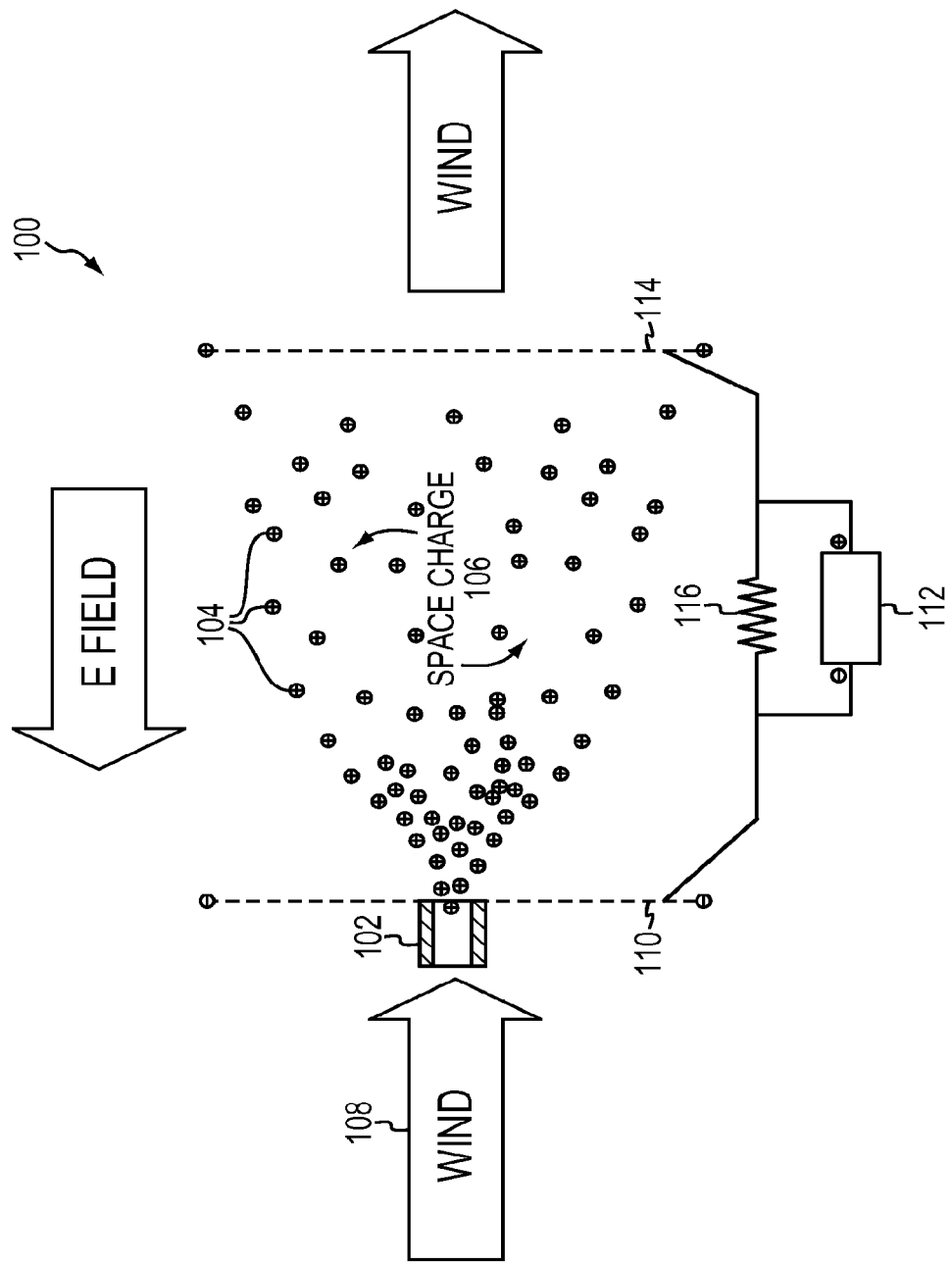
FIGS. 1-4 illustrate EHD systems in accordance with embodiments of the invention.

A basic principle of an EHD system involves using wind energy to move charged particles through an opposing electrostatic field. Moving a charged particle against a force gradient in an electrostatic field requires work. The work performed on the particle is converted into an increase in the field strength. More particularly, an ionic species, such as a positive ion, may be acted upon by the wind in an induced electrostatic field. The molecules of the wind collide with the charged ion and do work on it, causing it to move in a direction against the force imposed by the field. Consequently, the electric field strength (expressed as volts/meter) increases to a stable operating level. If the electric field is between two collectors, e.g., porous plates, meshes, or other conducting objects, the movement of charge induces its own field, and one collector becomes negative with respect to the other. As wind continues to drive the supplied stream of ions against the induced field, the voltage between the two collectors continues to climb. The electrostatic field strength stabilizes, and the work of the wind on the particles may be used to separate particles of opposing charges, entrain one species of charge, and convert the other, orphaned into an electric current. If the two collectors are electrically connected together, the current flows between them as a result of the difference in potential. If an electrical load is placed in series with the collectors, useful work may be performed. The complete electrical circuit is thus composed of the ion current, the positive collector current, the return current (which may include the ground), the load current, and the negative collector current.

The efficiency of an EHD wind-energy conversion system may be dependent on the ability of the wind to increasingly separate positive from negative charges. In terms of the physics, the wind force (in Newtons) on a water droplet can be described by the Stokes equation for laminar flow:

$$F_d=6\times\Pi\times\eta\times v\times r; \quad (1)$$

where η is the viscosity of the air, v is the relative velocity of wind with respect to a particle, and r is the radius of the droplet of water. Electrostatic force (in Newtons) is a function of the number of coulombs perched on the droplet, and the strength of the electrostatic field in which it is moving:

$$F_e=Q\times\in, \quad (2)$$

where Q is coulombs of charge and ∈=electric field (volts/meter).

The relative velocity of the wind with respect to a water droplet is determined by the force balance between drag force and electric field force. At steady state, those forces are in balance (i.e., equal) and the droplet is held immobile between the two opposing forces. EHD depends on the ability of the wind to push a droplet against the opposing electric field, thus performing work on the droplet. An effective EHD system allows the droplets to be pushed through the field at some optimum velocity appropriate to the wind and atmospheric conditions. During stable power output, the drag force on a water droplet is substantially equal to the electric field force on the water droplet (e.g., the system is in a steady state).

For a given wind speed, there is a droplet size, droplet charge, and field strength that extracts the maximum amount of wind energy. A droplet may be as small as possible to maximize its charge-to-mass ratio, but is also, in one embodiment, at least large enough to keep from evaporating before it completes its system circuit. In another embodiment, the droplet contains a solid material, or a material that becomes a solid when the droplet evaporates, which inherits the charge of the droplet, as explained further below.

One method of producing charged water droplets utilizes an electrospray process. The amount of charge on a droplet is determined by the efficiency of the electro spray process, with 70% of the charge limit as a typical number. Beyond the charge limit, more charge on the surface of the droplet causes the droplet to explode in what is called a “Coulombic explosion.” The size of the droplet is determined by a set of factors related to the electrospray process itself, but in general is a function of nozzle geometry, electric field strength in the vicinity of the nozzle tip, and the fluid pressure.

The droplet begins to evaporate as it leaves the nozzle. Evaporation rate is a function of temperature, pressure, and relative humidity (RH). RH is itself a function of the number of other droplets evaporating in the vicinity of the process from other nozzles.

The higher the collecting electrostatic field strength, the lower the output current is to collect wind energy. Simultaneously, the higher the field strength, the less charge is put into the air. The higher the field strength, however, the more the droplets tend to be driven back to their source nozzles. Thus, every wind speed and set of operational conditions has a maximum applied electrostatic collection field that permits operation. There is also an optimum field that permits collection of the maximum amount of energy.

Using standard sensors that provide information about incoming wind speed, air temperature, relative humidity, and pressure, we establish an EHD droplet and electric-field profile that extracts the maximum amount of energy from the wind. Operational parameters are sensed and adjusted in real-time. The system can be computer controlled, thus automating both fine and gross adjustments of key system parameters.

In addition, increasing or decreasing the $CO_2$ concentration in water is a means of altering pH and conductivity. For example, to increase $CO_2$ and lower pH, water may be trickled downward in a packed column while air is blown upward. This technique may be used to modify feed water to optimize energy generation.

In general, smaller charged particles are preferred. Unfortunately, liquid droplets on the order of 1 micron in diameter do not survive very long. They evaporate, leaving highly mobile and consequently ineffective free charge behind. One way to address this is to ensure that an evaporating particle of water leaves behind a solid or low-volatility liquid. Candidate solids include dust, pollen, manufactured items such as polymer balls, or solids formed by the final evaporation of liquid, such as salt crystals. Candidate liquids can include light oils that can be pre-agitated to droplets on the order of 0.1 to 0.01 microns in diameter, and uniformly mixed with water.

Electrospray ionization ("ESI") works in the same fashion. A carrier fluid droplet is charged using electrospray, and the charge originally on the fluid droplet is deposited on the contained molecules of interest. The same process works for other solid species. These charged species are entrained in the wind just like their parent droplet. In one embodiment, the carrier fluid (e.g. water) is seeded with a substance intended to carry the system working charge once the carrier droplets have fully evaporated.

In a related embodiment, the nozzles are placed such that electrospray droplets encounter airborne particles after nozzle emission. Here, the charged droplet attracts generally uncharged solid particles, such as soot, pollen, dust, and other similar airborne substances, and entrains and absorbs them. The ultimate effect is the same as before, with the solids acting as charge carriers once water has evaporated. Droplets with contaminants, or residual charged contaminants, may be removed using a downstream collection grid. Employment of a downstream grid effectively performs the function of an electrostatic dust precipitator. In urban settings, such a arrangement can serve the dual purposes of energy generation and air purification by particle removal.

In other embodiments, liquids other than water are used as the charge-carrying fluid. Any fluid that can form electrospray is a candidate. There are classes of fluid, having low vapor pressure and low volatility, that may have fewer tendencies than water to evaporate during the time span of energy collection. Such fluids have the advantage that much smaller droplets may be employed without danger of complete droplet evaporation and consequent release of free charge.

In one embodiment, the working fluid is environmentally friendly and biodegradable. In other embodiments, the charge carriers are species of molecules that are beneficial to downwind elements. For example, a typical application might be to charge a type of fertilizer, so that downwind soil is fertilized.

One aspect of putting a cloud of charge into the air is that it creates a space charge that is self-repulsive. Like charges repel one another and a cloud of like charges is highly self repulsive. A space charge cloud wants to push itself apart, but it also resists a like charge being pushed into it. This is the situation with EHD particles. A particle exits a nozzle and immediately is pushed by the wind towards the cloud of charge immediately downwind.

The nominal field strength from space charge in the shape of an infinite wall is described by the following formula:

$$E=\rho L/2\in, \quad (3)$$

where E is the space charge field [Volts/meter] at entry to charge wall, $\rho$ is the charge density (coulombs of charge per cubic meter), L is the thickness of the charge wall, and $\in$ is the universal permittivity constant of space (i.e., 8.85E-12 Coulombs$^2$/(Nm$^2$)).

Geometrical aspects of the space charge field may influence its strength. For instance, space charge in the shape of a cylinder, rather than a wall, has a weaker induced electric field than a wall of charge. A flat sheet of charge, such as one that might be emitted from a single line of nozzles, may have an even lower space charge.

Space charge may be taken into account along with the other system variables such as wind speed, particle size and charge, and relative humidity (natural and induced), among others. The charge density may be controlled to account for the space charge effect. In one embodiment, control is modulated in real-time by a computer which examines all system parameters through the use of sensors and takes appropriate system action in order to optimize energy output for a given wind speed or other local environmental condition.

Space charge is directly proportional to the quantity of a specific charge, plus or minus. If plus and minus charges are mixed together, they effectively neutralize, and space charge is lessened or eliminated. In one embodiment, a nozzle configuration alternates nozzles or rows of nozzles that put out, alternately, positive and negative charges. Power is still generated by employing the standard EHD model described herein; however, as the opposing charges mingle, their charges are neutralized and space charge is minimized or eliminated. Such a space charge reduction enables more efficient wind energy collection by enabling the employment of higher charge density without the penalty of the space charge.

There are two electrostatic fields fundamental to EHD operation. One field, the electro spray field, surrounds each electro spray orifice; the other field, the collection field, opposes the motion of droplets in the wind. While these fields do indeed interact with one another, for the purpose of control we can treat them separately.

A strong collection field implies a high collection voltage. Field strength (volts/meter) depends in part on the physical relationship of upwind voltage and a downwind charge collection grid. For instance, a nozzle array operating at −200 kV with a grounded collection grid one meter away from the nozzles would have a nominal collection field of 200 kV/meter. The space charge field is added to the collection field to describe the total field that a particle experiences when passing into and through the collection zone between nozzle and downwind grid. In one embodiment, a downwind collector grid employs adjustable spacing between itself and the electrospray nozzles (upwind grid) to advantageously configure itself to an optimal distance.

For water flow rates per nozzle that are sufficiently low, as when droplet sizes are small and charge per unit mass is high, atmospheric condensation of water may be used as a water source for the EHD process. It takes energy to condense water from the air; this condensation energy must be subtracted from the total energy output. Under favorable conditions, however, such as high humidity and moderate temperatures, condensation may be used advantageously.

Condensation energy may be minimized by utilizing an air-to-air heat exchanger. Moisture-laden air coming into the condenser may be cooled by drier air exiting. Although there may be an enthalpy mismatch between the air streams, and incoming air may not be fully cooled, energy savings may be significant.

Condensation for water supply may be exploited anywhere, thus providing more freedom in system citing. Locations for condensation-supplied systems include sites with no local or municipal water, and airborne systems.

FIG. 1 illustrates one embodiment of an EHD energy capture system 100. A charge generator 102 creates a number of particles 104, which may be ions, water droplets, or other suitable charge-carrying particles, thereby creating a space charge 106. The space charge 106 is porous to the wind 108 that blows through and among the charged particles 104, driving them by hydrodynamic coupling in a direction generally the same as the wind direction. A first, upstream charged mesh 110, porous to the wind, is charged with a polarity opposite to the space charge 106. As the particles 104 are driven away from the upstream charged mesh 110, the voltage of the upstream charged mesh 110 is maintained by a voltage regulation circuit 112 with respect to a second, downstream charged mesh 114 that collects the charged particles 104. In some embodiments, as explained further below, the downstream mesh 114 may be eliminated, and its function replaced by ground or by charge recombination in the downstream air. As work is performed on the particles 104 by the wind 108, excess positive charge near the downstream collector 114 pulls negative charges from the upstream collector 110. The voltage regulator 112 bleeds electrons from the upstream mesh 110 to maintain a constant voltage. The current formed by the flow of electrons may be passed through a load 116 to perform useful work. In one embodiment, the creation of a positive ion at the charge generator 102 simultaneously creates an electron. The electron travels from the upstream collector 110 and moves through the load 116 to meet back up with its mate on the downstream mesh 114.

Figure 2:
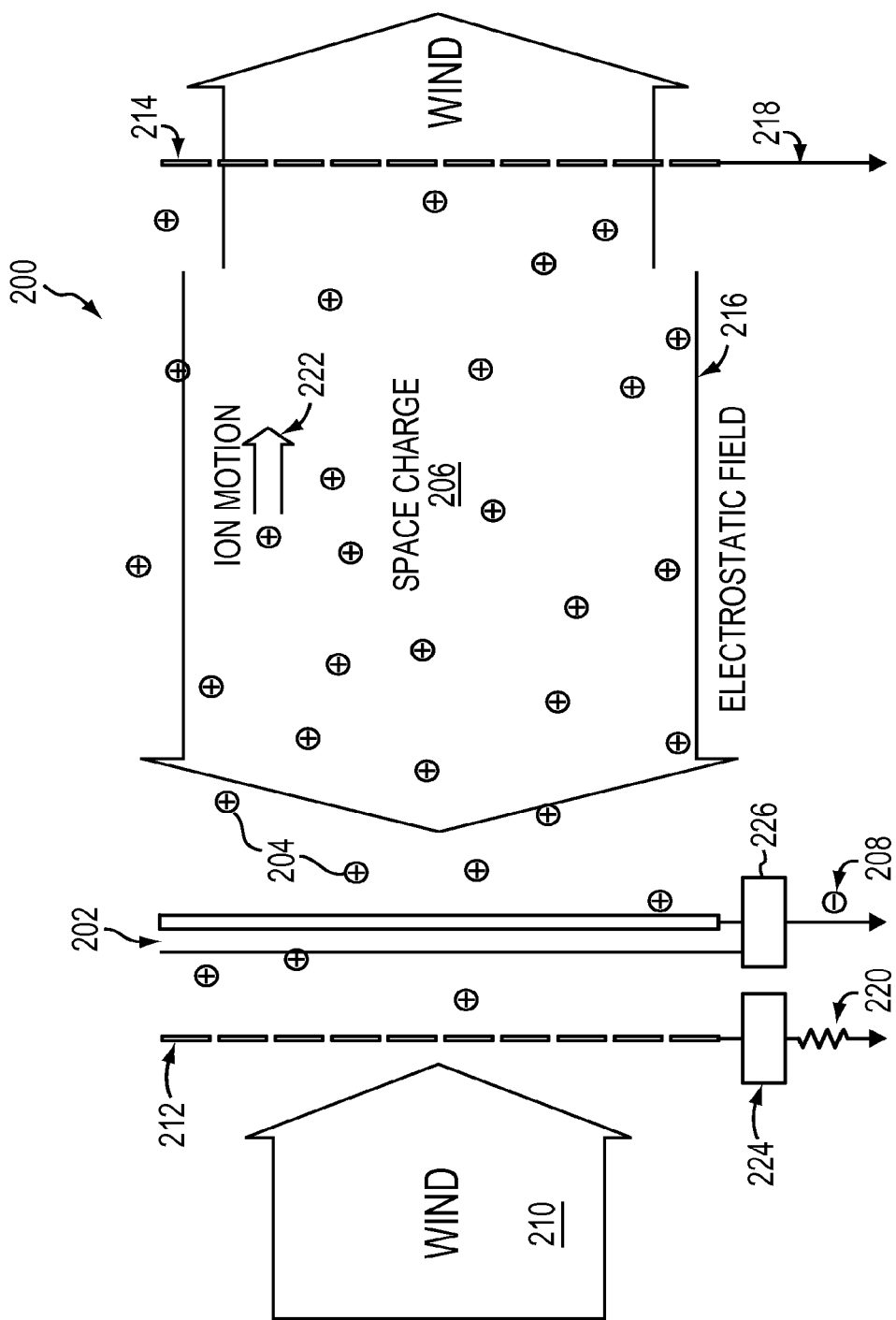

FIG. 2 illustrates an alternative embodiment of an EHD energy capture system 200 that separates the ion source 202 from the EHD power circuit. In this embodiment, the ion source 202 provides one species of ion 204 for use in the space charge field 206, and grounds the oppositely charged ions 208 thereby generated. As the working ions 204 are blown by the wind 210 into the space charge 206 between the upstream and downstream collectors 212, 214, an electrostatic field 216 is induced, and the downstream collector plate 214 collects the charges 204. The ion source 202 may be a corona-wire ion source, the voltage of which may be decoupled from the voltage of the upstream collector 212.

The corona effect ion source 202 may be electrically separated from the space charge 206 portion of the system 200. The counter ions 208 created by the ion source 202 are drained to ground where they may be available to the upstream and downstream collectors 212, 214. With the downstream collector 214 connected to ground 218 and the upstream collector 212 connected to a load 220, both collectors 212, 214 may interact with electrons from ground. The space charge 206 and the motion 222 of the charged particles 204 against the electrostatic field 216 may induce a negative voltage in the upstream collector 212. The negative bias of the upstream collector 212 may be held at working voltage by a voltage controller/regulator 224. The current that flows through the controller 224 may be harnessed at the load 220 to perform useful work.

In one embodiment, the original charge that begins driving the process is provided by a power supply 226 in the ion source 202. In another embodiment, stored or outside energy is used to power up the system 200. Once in progress, wind-derived electrical energy may be bled parasitically from the main system to power the ion source 202. In some embodiments, the ions 204 may be created at the ion source 202 and transported to a distal location using, for example, a tube or pipe constructed of, e.g., plastic or metal. The tube may have electrospray orifices along its length. Such an arrangement may be advantageous for weight reduction in systems where, for example, a heavy wave guide is undesirable.

In other embodiments, the ion source 202 is an electrospray generator, an electron-cyclotron resonance ("ECR") ion generator (powered by microwaves), a helicon ion generator, and/or an inductively-coupled ion generator. In one embodiment, air itself is the ion source and the bulk media. An ECR ion generator, in comparison to a corona-effect ion generator, can have higher energy efficiency (expressed in coulombs of ion charge per energy input, or C/W), higher conversion efficiency (expressed in moles of target ion species created per mole of available neutral species, or moles/mole), and proportional control over a wider power band. ECR ion generation thus enables energy extraction from wind at lower wind speeds than those required by corona-based or water-droplet-based systems.

At lower wind speeds, the upstream collector 212 voltage may be lowered to prevent the ions 204 from drifting backward due to ion mobility in the lower electrostatic field. The minimum or "cut-in" wind velocity may be arbitrarily low, thus capturing wind energy at speeds comparable to or lower than those required by conventional wind turbines. Typical cut-in speeds for conventional wind turbines are around 8 mph (3.6 m/s). At low wind speeds, the EHD energy capture system may capture significantly more wind energy than a conventional wind turbine.

Proportional control of the ion source 202 over a broad range of ion output densities permits simultaneous optimization in coordination with the controlled voltage of the collectors 212, 214. For a given wind velocity, there is corresponding collector voltage that creates a suitably high electric field so that energy may be captured, but suitably low to prevent drawing back working ions due to charge mobility within the field. Likewise, the ion density, which induces the electric field, may be controllable within a range suitable for maximum energy extraction.

Figure 3:
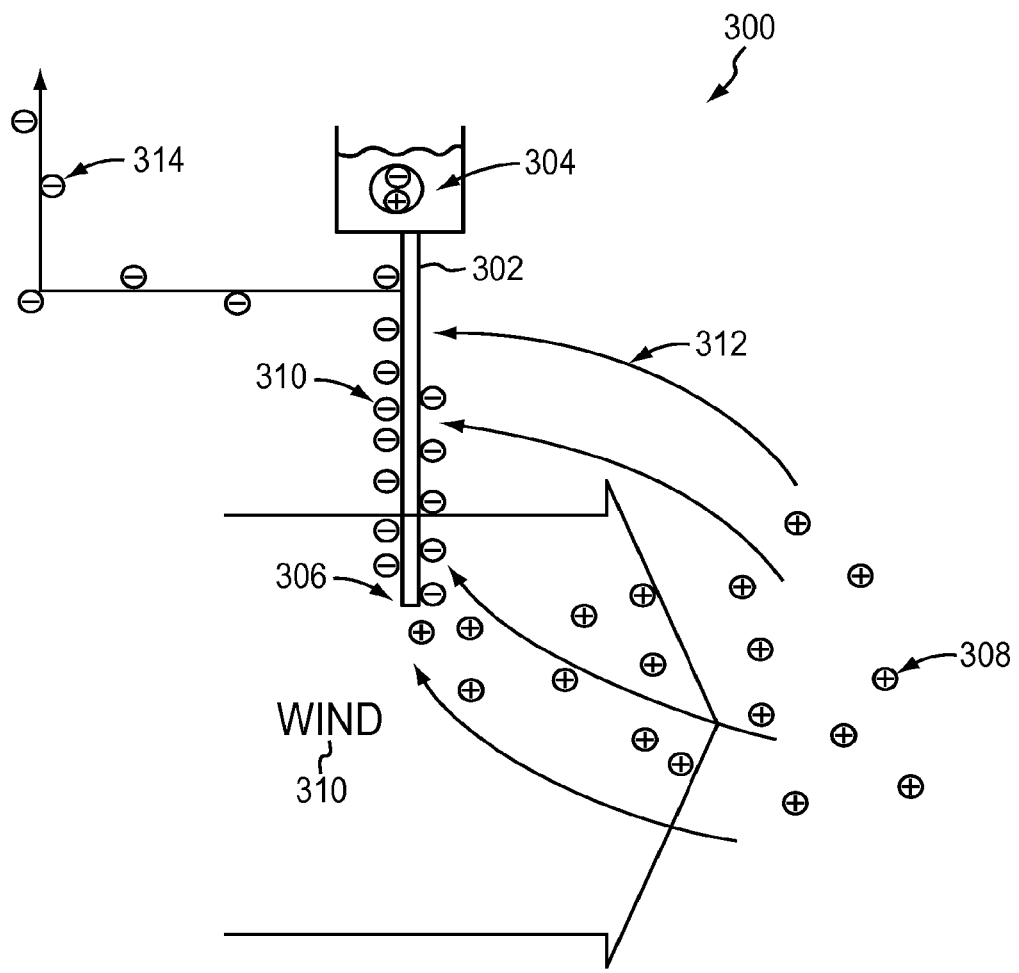

FIG. 3 illustrates one embodiment of an EHD energy capture system 300 having a single collector 302. An electrically neutral fluid, having equal numbers of positive and negative charges, is stored in a feed source 304. At a charge separation point 306, positive charges are deposited on charge carriers 308 which are carried away by the wind 310. Negative charges 310 are left behind on the collector 302. An electric field 312 forms as a result of the force between the opposing charges. As more positive charges 308 are driven away by the wind, more negative charges 310 are left behind, thereby increasing the strength of the electric field 312 and creating a reservoir of charge that can be drained off as current 314. If the electric field 312 becomes too strong, however, it may overcome the force of the wind 310 on the positive charges 308, and the charges 308 will not be blown away from the collector 302. Embodiments of this invention thus can be controlled to seek to maintain a steady-state balance, wherein the wind force is strong enough to separate the charged particles from their source.

Figure 4:
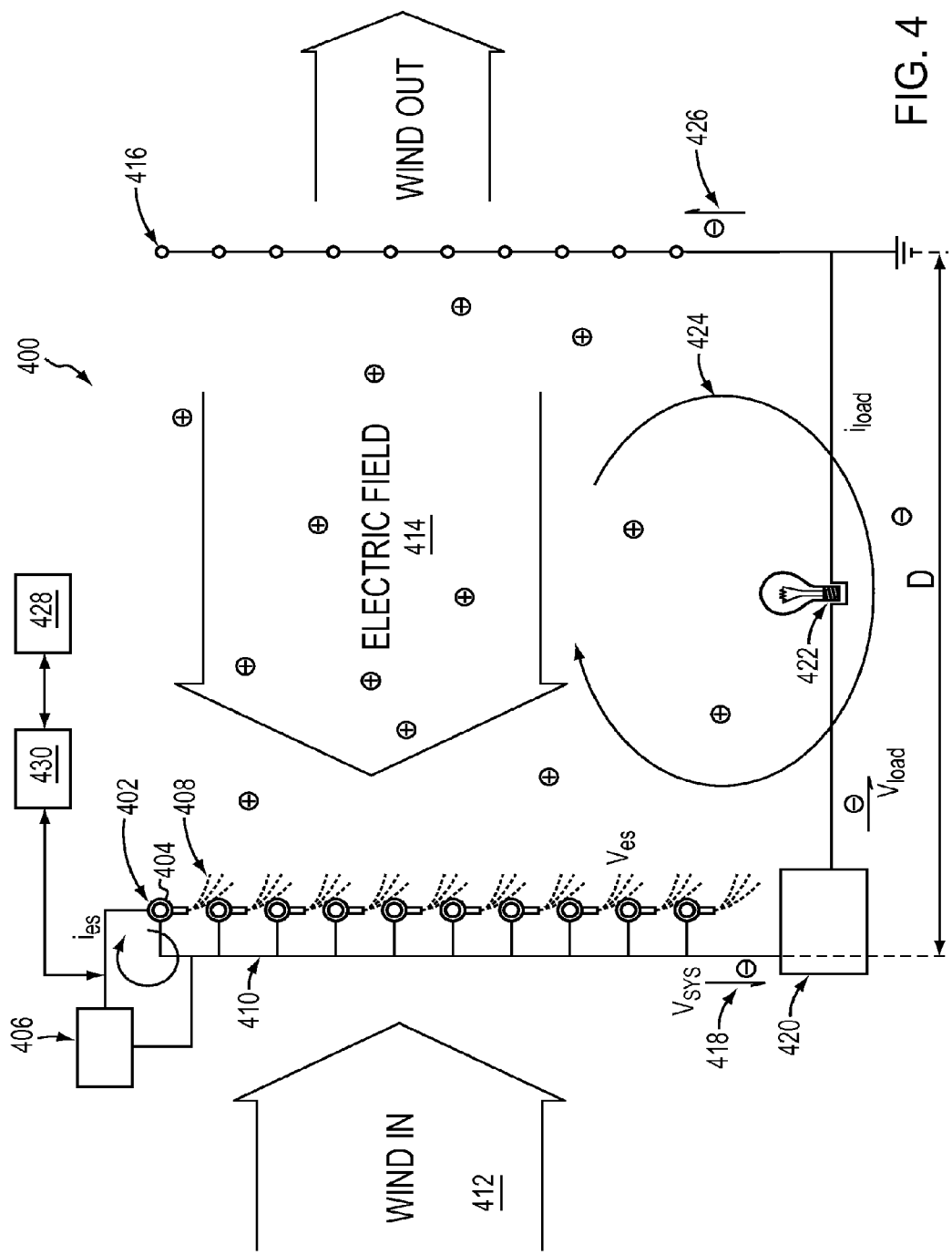
Figure 5:
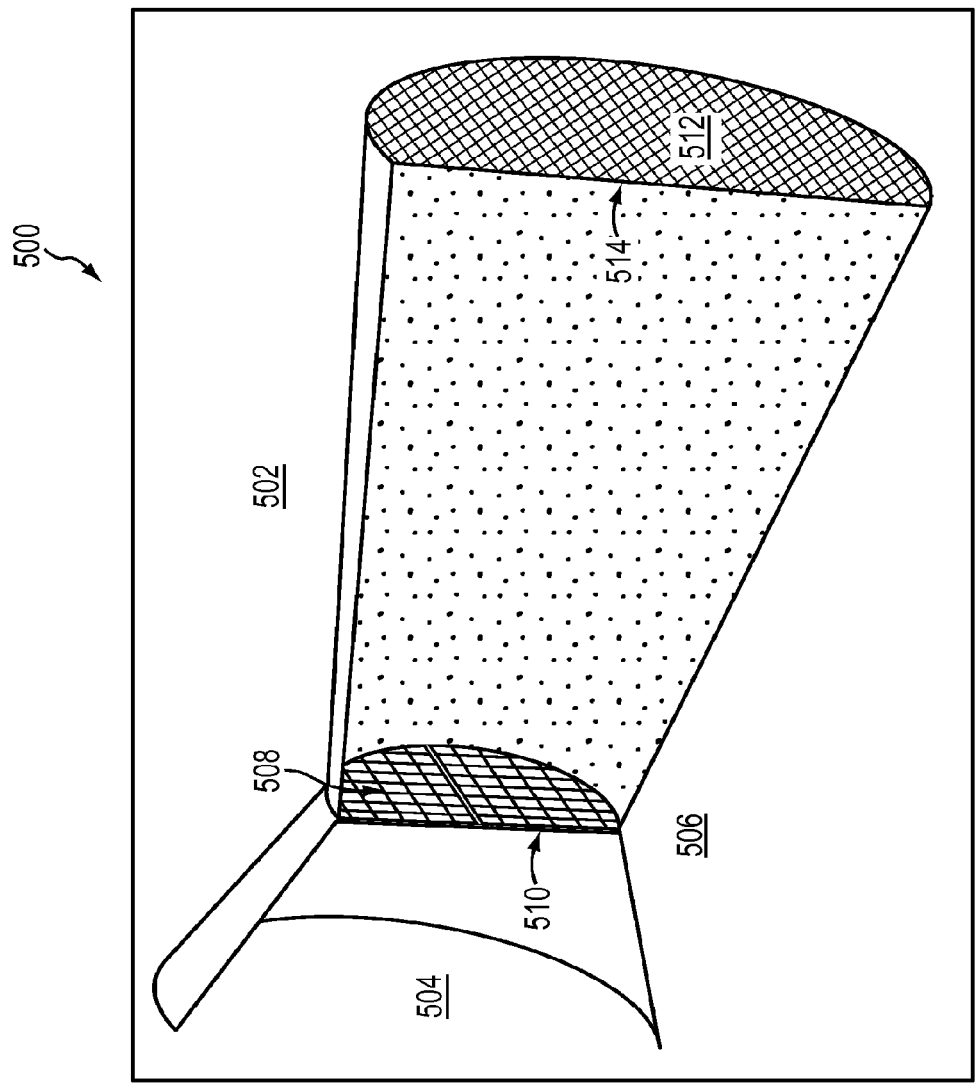

FIG. 4 illustrates one embodiment of an EHD system 400 that uses electrospray nozzles 402. The electrospray nozzles 402 may be filled with a working fluid 404 that is maintained at a given pressure by, for example, pumping the fluid 404 from a suitable fluid supply reservoir or receiving the fluid 404 from a pressurized source. An electrospray voltage $V_{es}$ and an electrospray current $i_{es}$ are applied to the nozzles 402 to create electrospray. In one embodiment, the electrospray voltage $V_{es}$ is approximately equal to 5 kV and the electrospray current $i_{es}$ is approximately equal to 200 nA. The electrospray current $i_{es}$ and voltage $V_{es}$ may be supplied by an electrospray power supply 406 that, in one embodiment, derives its power from the output of the EHD system 400 itself. When the EHD system 400 starts up, the power supply 406 may employ energy stored from prior output to start the system 400.

Charged droplets 408 are created by the electrospray and may be emitted from the upstream collector 410 as a generally continuous plume of charge. The upstream collector 410 may be a screen or mesh grid, the electrospray nozzles 402, or any other charge-bearing material near the electrospray 408. In various embodiments, the droplets 408 are positively or negatively charged. The droplets 408 are entrained by the wind in 412 and may be carried into an electric field 414. The electric field 414 is defined by (1) the voltage difference between a system voltage $V_{sys}$ on the upstream collector 410 and a downstream collector and ground 416, and (2) the distance D between the two collectors 410, 416. For example, in one embodiment, $V_{sys}$ is 100 kV, ground is 0 V, and the grid spacing D is 0.5 meters. The electric field 414 will therefore have a strength of 100,000/(½)=200,000 volts/meter.

The system voltage $V_{sys}$ is created by negative charges, e.g., electrons, left behind by the positively charged fluid droplets 408. The system 400 may also operate by creating negative droplets, thereby leaving behind positive charges on the upstream collector 410. The more electrons left behind, the greater the negative voltage drop on the system voltage $V_{sys}$, and the greater the strength of the electric field 414. For any given wind conditions (e.g., speed and/or direction), a certain amount of drag is available to carry the charged droplets 408 through the electric field 414. Thus, a balance between wind speed and electric field strength determines the optimal operating point of the system 400. The strength of the electric field 414 may be varied by adding more droplets 408 per unit time and/or varying the charge per droplet 408.

Once the system voltage $V_{sys}$ achieves a steady-state value, electrons left behind by the electrospray may form a current $i_{sys}$ and flow via a path 418 through a transformer 420. In one embodiment, the output from the system 400 is high voltage and low current. Output from the transformer 420 will typically be lower voltage and higher current, thereby matching the requirements of a particular load 422. The load voltage $V_{load}$ and the load current $I_{load}$ are, in one embodiment, approximately equal to 115 VAC and 30 Amps, respectively, matching the requirements of a household power supply.

Under steady-state conditions, the flow 418 of electrons from the upstream collector 410 is equal to the positive charge flow carried on the positively charged droplets 408. This overall system current 424 may also be equal to the ground current 426 ($i_{ground}$) that neutralizes incoming positive charges 408 at the downstream collector 416. Note that current may alternatively be defined in the direction of electron flow or opposite the direction of electron flow.

In one embodiment, the downstream collector 416 is removed from the system 400, leaving only the upstream collector 410. Instead of a downstream collector, the system 400 may use any electrical ground as a pool of free charges. In one embodiment, the electrical ground is the Earth. The upstream collector 410 may be conductive and porous or foraminous. The upstream collector 410 may create a capacitive couple with the electrical ground.

Eliminating the downstream collector 416 may create a much larger length for distribution of system voltage. For instance, if the nominal distance between the upstream voltage and ground is 10 meters, then the system sees an applied voltage of 200 kV/10 m=20 kV/m field. At the same time, the space charge field may not be bounded by the downwind grid, and it increases linearly with the thickness of the space charge. Elimination of the downstream collector 416 may be best suited for systems where the energy output is not space-charge limited.

In one embodiment, the system 400 includes a sensor 428 that measures ambient atmospheric parameters such as wind speed, temperature, humidity, as well as internal parameters like the strength of the electric field 414. A control system 430 may communicate with the sensor 428 and alter a parameter of the system 400 in response to the received sensor 428 data. For example, the control system 430 may modify the rate of creation of the charged particles 408 and/or vary the amount of charge on each particle 408 in response to a changed atmospheric parameter. The control system 430 may include a local computing device/processor or a remote device/processor, and may receive data from the sensor 428, process it, and adjust a parameter of the system 400 in real-time. The control system 430 may be programmed with a look-up table of recommended system 400 parameters for a given set of atmospheric conditions, and/or may determine optimal parameters through experimentation and feedback. For example, if the velocity of the wind 412 increases, the control system 430 may raise $V_{sys}$ and/or $i_{sys}$ in response. In some embodiments, the control system 430 increases the flow rate of the charged particles 408 in response to increasing wind speeds, particularly if the increased wind speed is less than about 25 mph. In other embodiments, the control system 430 raises the amount of charge per particle 508 with increasing wind speed (and a corresponding increase in wind drag per particle to support the increased charge). The control system 430 may also increase particle size and decrease charge per particle as wind speed increases, to take advantage of the increased wind drag, or decrease particle size as humidity increases to take advantage of the slower rate of evaporation. The control system 430 may take similar but opposite actions when wind speed decreases.

Diffuser Augmentation

FIG. 5 illustrates a cross-sectional cutaway view of one embodiment of a diffuser 500 for increasing the flow velocity and mass flow rate through a specific area of an EHD system called diffuser augmentation ("DA"). DA may use a shaped structure to force a large cross-sectional area of wind flow into a cross-sectional smaller area, thus causing an increase in the wind's velocity in the smaller area. Higher-velocity wind flow may be advantageous to charged-particle entrainment and drag forces against which the electric field is applied, and may allow a stronger electric field than would otherwise be possible.

Charged particles are entrained in the enhanced wind and create a space charge, per prior discussion, in a constrained and controlled space defined by the diffuser 500. In the diffuser 500, radial expansion of the wind is constrained by the walls of the diffuser 500. In one embodiment, the walls of the diffuser 500 are charged to repel the space charge. Expansion of the space charge may prevent separation of flow from the diffuser wall as mass flows towards a downstream collector 514. As before, a voltage field is set up between the upstream and downstream collectors 508, 514. Electrically connecting the collectors 508, 514 creates a circuit from which energy may be extracted.

The diffuser 500 is one embodiment of a radially symmetric DA-EHD device. A region 502 of ambient air outside of the diffuser 500 has a bulk wind velocity $V_0$. As the ambient air encounters the intake zone 504, it assumes a new velocity $V_1$ in accordance with the shape of the intake zone 504. The air within the intake zone 504 is accelerated to a new velocity $V_2$ as it moves toward the throat area 506, and experiences a commensurate drop in pressure in accordance with Bernoulli's law. At the throat 506, the wind moves through an upstream collector 508, and charged particles are injected into the wind by a distributor 510. The particles may be water droplets, charged dust, or simply charged species of air molecules. From the distributor 508, a space charge is created by the moving cloud of charge. By the nature of the diffuser, and because the space charge naturally wants to expand, pressure increases and velocity decreases as flow moves toward the exit 512 of the system. The wind passes through a downstream collector 514 with a corresponding lower velocity $V_3$. In one embodiment, the upstream collector 508 is a conductive ring around the high-velocity zone, thereby allowing for smoother flow of wind through the throat 506.

The ratio of the cross-sectional area of the exit 512 to the throat 506 may be less than approximately 4.5. The velocity $V_2$ of the wind in the throat 506 may be approximately equal to twice the ambient wind speed $V_0$, and the velocity $V_3$ of the wind at the exit 514 may be approximately equal to one-third of the ambient wind speed $V_0$. Other geometries and values are contemplated.

Figure 6:
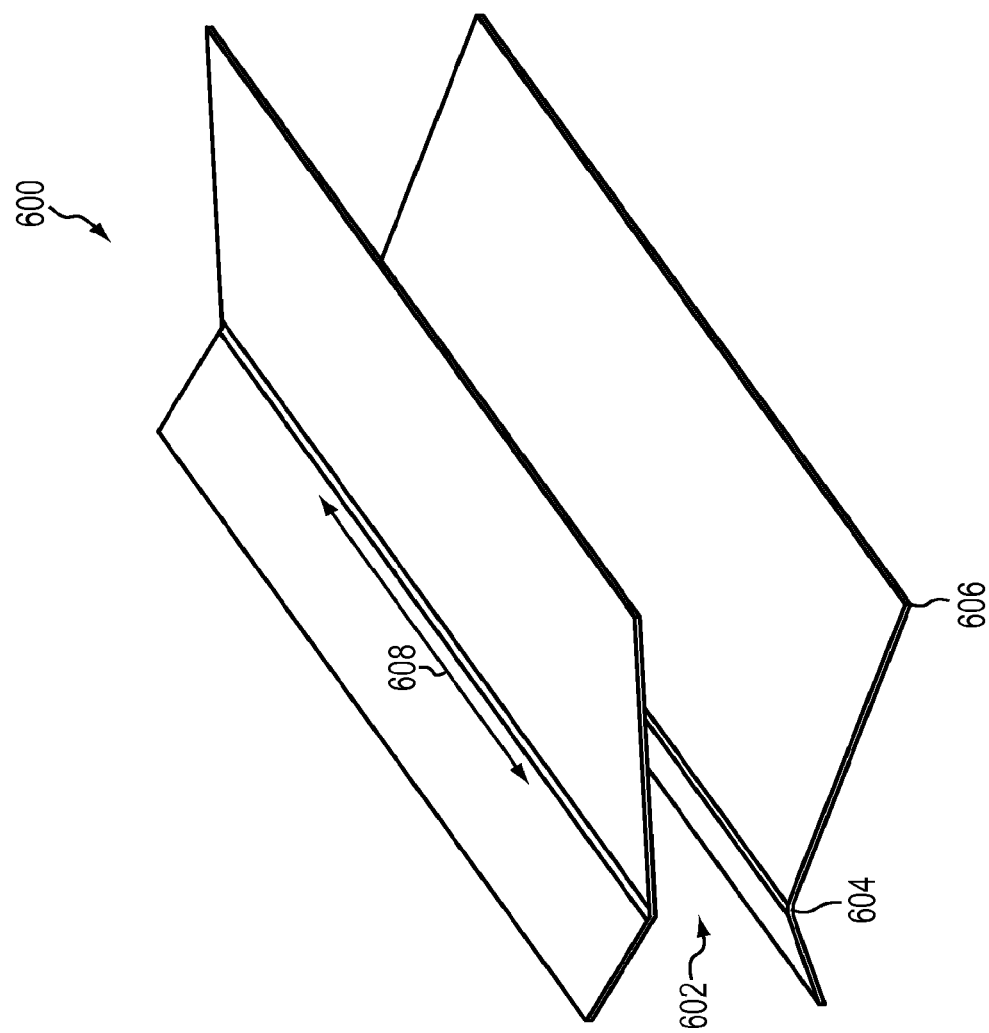

FIG. 6 illustrates a partial sectional view of one embodiment of a linear DA-EHD housing 600. Ambient wind enters the linear diffuser 600 at an intake zone 602, accelerates at a throat 604, and leaves at an exit 606. An upstream collector and distributor may be positioned near the throat 604, and a downstream collector may be positioned near the exit 606. The linear diffuser 600 may be arbitrarily long about its longitudinal axis 608, and may be mounted on, for example, hill tops, buildings, and the like.

FIGS. 7A-7B illustrate one embodiment of a DA-EHD balloon diffuser 700. The balloon diffuser 700 includes a balloon 702 and a duct 704 that surrounds the balloon 702. The front area 706 of the balloon 702 may act as an upstream collector, and the air flow may be driven into the boundary layer 708 that surrounds the flow-enhanced circumference. The duct 704 may be constructed of a light frame with fabric stretched between, and the balloon 702 may be constructed of a suitable air-impermeable membrane and filled with an appropriate gas. The balloon diffuser 700 may be used with either an air-based or a water-particle-based EHD system. In one embodiment, the balloon diffuser 700 is positioned within a cloud. The balloon diffuser may also include lifting elements, such as wing structures, to add lift to the overall structure.

The DA systems illustrated in FIGS. 5-7B feature several advantages. For example, the DA systems permit capturing energy from the nominal intake area and, in addition, the enhanced velocity at the throat permits higher electric field strengths. Furthermore, due to the enclosed nature of the DA systems 500, 600, 700, the electric field may be better controlled between the collectors. The ratio of downstream to upstream collector area may better match the aspect ratio of the electric field. Inside the DA systems, the space charge is radially or transversely constrained, so that natural internal repulsion adds to velocity in the desired work direction. The diffuser sleeve prevents ionic species from migrating in from the bulk flow and prevents charge neutralization. The DA designs contemplated by the present invention may enhance EHD systems that use such charge carriers as plain air, charged dust, water droplets, or rigid foam balls. If a fluidic charge carrier is desired, the design may be adapted for closed-loop flow (by, e.g., water recycling). The DA systems may be adapted for lighter-than-air configurations.

Dielectric Barrier Discharge

In one embodiment, a dielectric barrier discharge ("DBD") device is used as an ion source to create charged species using air alone, with no separate charge carrier. DBD may be combined with DA to create a DBD-DA EHD device that has no moving parts (other than the wind itself). DBD plasma conditions may be varied to promote creation of specific ionic species. For instance, by combining a voltage field transverse to the AC field of the DBD, ions of specific charge may be extracted to either side of the dielectric plate(s). The ions may then be employed to create an entrained space charge and the oppositely charged collector.

DBD may also be employed to charge naturally occurring dust particles. These particles occur with great abundance in the atmosphere. The mobility of a dust particle may be less that that of an air molecule, while, at the same time, the dust particle may hold a large electric charge.

An electric field transverse to the collector field lines may be modulated to motivate a charged species transverse to the flow. An ion thus perturbed may experience more collisions with the wind per unit time, and may be further influenced by those collisions generally opposite to the direction of the applied field. The ion's mobility is effectively lowered by such a means. The advantage of slowing the ion's mobility is that higher field strengths may be employed for wind energy extraction, and thereby improve energy extraction efficiency.

Injection of Charged Water Droplets Using MEMS

In various embodiments, EHD systems may inject charged water droplets into the air using micro-electro-mechanical structures ("MEMS") that incorporate appropriate pressure, flow, and voltage conditions. In particular, MEMS-based ink jet spraying and electrospraying combine droplet formation with droplet charging.

Ink-jet technology optionally employs piezoelectrical vibration to eject ink droplets from an orifice, and then adds charge to each droplet as it finds its way to the print media. Conventional individual inkjet ejectors, which may consume 0.5 µJoules of energy to create one droplet, may not be efficient enough for use in an EHD system. A system that employs 2D ejector arrays with resonant actuators, such as piezoelectric crystal or capacitive actuators, may fire droplets from large arrays of orifices. For example, a 2D array may contain 20×20 holes, and may be driven in excess of 1 Mhz. As one example, the energy per droplet using a single ethyl alcohol reservoir micromachined ejector array is 0.0037 µJoules. Water energy per drop is deemed to be similar. Further optimization of the MEMS devices may bring this energy figure down even further.

Similarly, electrospraying induces a charged droplet stream from a small nozzle with little significant pumping energy other than an applied electric field. Electrospray ionization ("ESI") is a process of special interest to EHD systems. ESI may be deployed at the microscale using MEMS technology to combine the creation of energy-efficient ultrasonic droplets with electrostatic charging. In various embodiments, a MEMS ejector reservoir array may be combined with a voltage source, thus creating an energy-efficient electrospray device having a large number of ejector nozzles. Besides creating the droplet itself, additional energy may be required to charge the droplet, to remove particles that might clog the micro-nozzles, and to move the fluid around from source to nozzle. Energy requirements for these processes are small compared to droplet creation energy and related inefficiencies.

Figure 8:
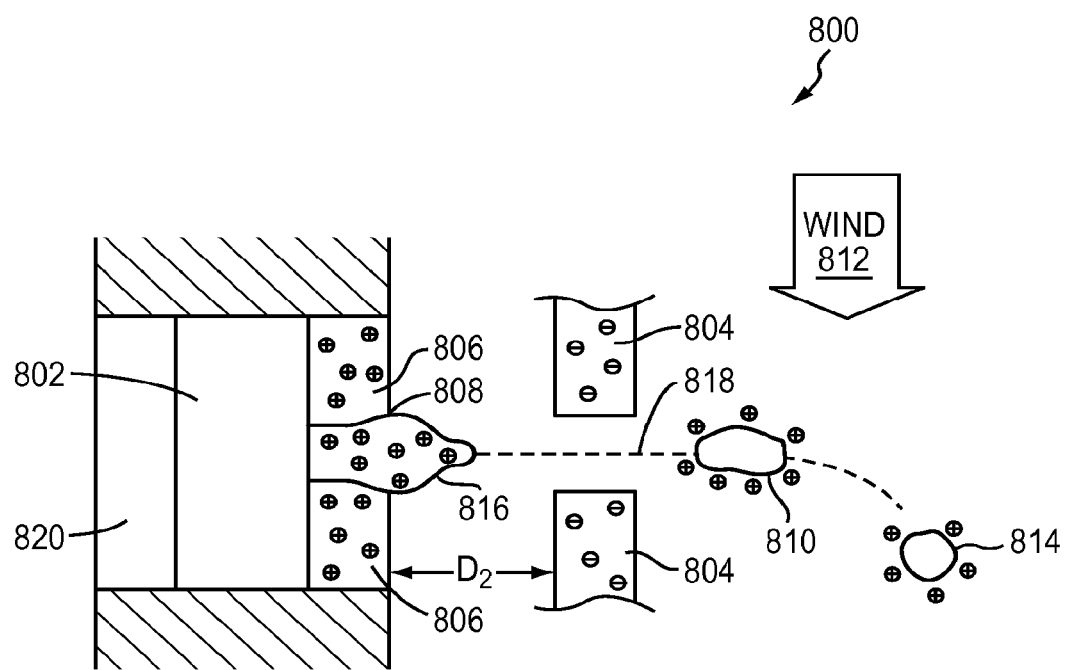
FIGS. 8-10 illustrate nozzle configurations in accordance with embodiments of the invention.

FIG. 8 illustrates one embodiment of a MEMS charged-particle source 800 that combines an ejector reservoir 802 with a porous charge plate 804. A nozzle plate 806, separated from the charge plate 804 by a distance $D_2$, may be charged to the same potential as the desired charge of a droplet 808, for example, to 1 kV. The charge plate 804 may be biased at a potential opposite to the potential of the nozzle plate, for example, at −5 kV. In an alternative embodiment, the charge plate 804 may be set to a positive voltage and the nozzle plate 806 to a negative voltage. In one embodiment, the potential of the charge plate 804 is the same as the potential of an upstream collector. The fluid in the reservoir 802 near a nozzle 808 acquires the same potential as that of the nozzle plate 806. The charge plate 804, being set to an opposite potential, attracts the fluid away from the reservoir 802. The fluid may exit the reservoir 802 and form a charged droplet 810. The wind 812, which may be perpendicular to the surface of the reservoir 802 and charge plate 804, entrains the droplet 810 carries it to a new position 814.

In one embodiment, the fluid in the reservoir 802 forms a Taylor cone 816 before separating to form a droplet 810. The size of the nozzle 808, the distance $D_2$, and the potentials on the plates 804, 806 may all play a role in determining the particular mode of the Taylor cone. In various embodiments, the source 800 is designed to have stable Taylor cones that emit droplets 810 at regular and repeatable intervals.

In one embodiment, the droplet 810 is drawn at high velocity toward the charge plate 804, but, because there is a hole 818 immediately opposite the nozzle 808, the droplet 810 passes through and is entrained in the bulk wind flow 812.

In an alternative embodiment, charged particles are injected directly into the wind stream 812 without the use of the charging plate 804. In this embodiment, an actuator 820 may be used to provide energy to the fluid in the reservoir 802. The actuator may also be used in conjunction with the charging plate 804.

In one embodiment, the diameter of the nozzle 808 is on the order of the diameter of the droplet 810, which may be between 3 and 10 microns. In other embodiments, the Taylor cone 816 may enable the production of droplets 810 that are smaller than the diameter of the nozzle 808, such as, for example, sub-micron-sized droplets.

Charging the droplets 810 to a potential close to their Rayleigh limit charge may have additional benefits. For example, when a charged droplet 810 begins to evaporate in the bulk flow 812, the charge on the droplet approaches its Rayleigh limit. Once the limit is achieved, the droplet may break apart into smaller charged droplets in a process called a Coulombic explosion.

Figure 9:
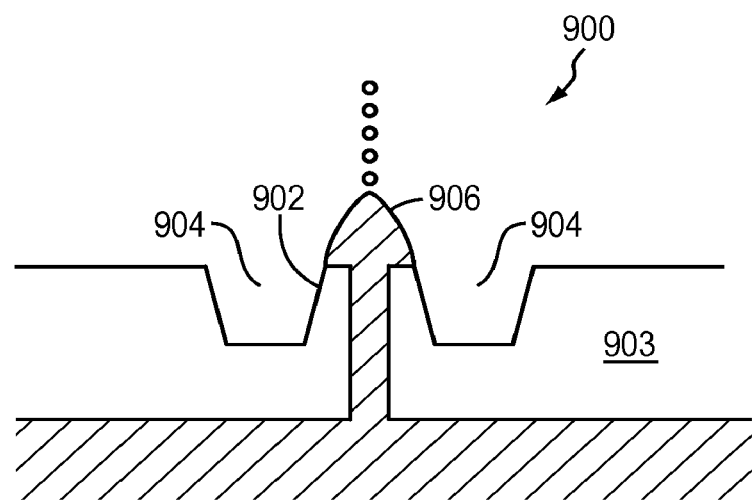

FIG. 9 illustrates one embodiment of a nozzle configuration 900. A nozzle 902 is formed on a substrate 903 and may be surrounded by a generally annular channel 904, thereby forming a depression around the nozzle 902. The channel 904 isolates the nozzle 902 from the generally planar substrate 903 and can aid in the formation of a Taylor cone 906.

Figure 10:
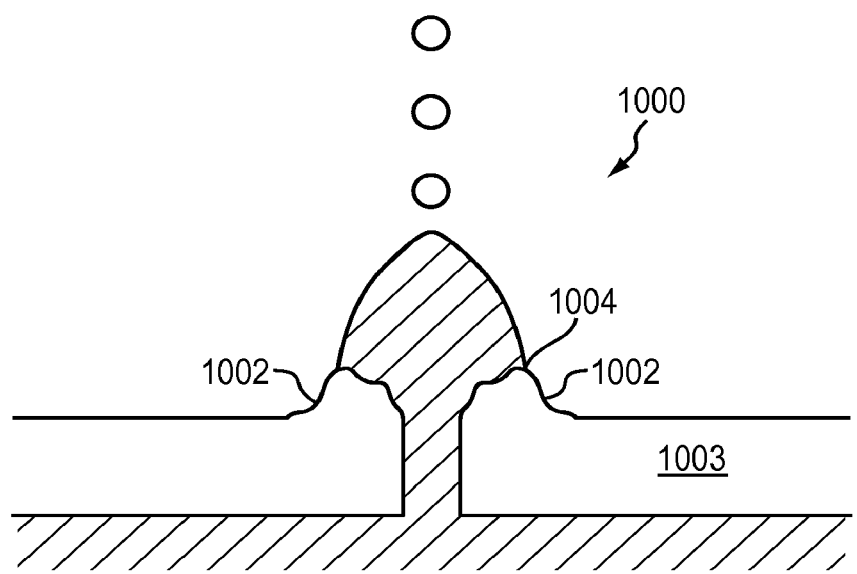

FIG. 10 illustrates an alternative embodiment 1000 in which a raised zone or "scarf" 1002 is created on a substrate 1003 around a nozzle 1004. The scarf 1002 may include material removed during the formation of the nozzle 1004, and may be a natural byproduct of non-volatilized material removal.

In an alternative embodiment, pre-existing hypodermic tubing or pre-shaped electrospray elements such as those fabricated by Phoenix S&T of Chester, Pa. may be used.

In general, electrospray nozzle performance may be position dependent. For example, facing a nozzle downward may allow gravity to assist in formation of a Taylor cone. The nozzle may be faced in any direction, however, and still perform its function. The nozzle itself may take a variety of forms, including both single and ganged approaches. A ganged approach is exemplified by any cluster of ordered nozzles that form part or whole sections of electrospray nozzles.

Electrospray System

Figure 11:
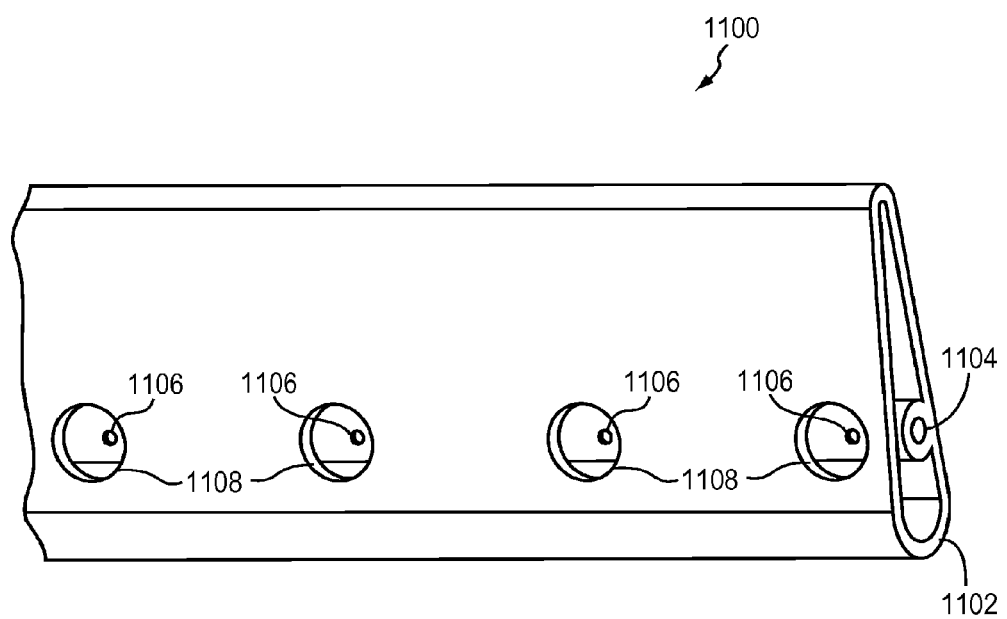
FIGS. 11-12 illustrate EHD extrusion bodies in accordance with embodiments of the invention.

FIGS. 10-19 illustrate, in various embodiments, an EHD electrospray system. FIG. 11 illustrates a structure 1100 that includes an extrusion body 1102, a fluid channel 1104, and electrospray nozzles 1106 within electrospray clearance holes 1108. The electrospray nozzles 1106 may be part of the plastic extrusion body 1102 that also includes some post-extrusion processing. The extrusion body 1102 includes an airfoil shape, which may minimize turbulent losses at the nozzle array. The airfoil shape may also permit control of high- and low-pressure areas suitable for various system processes. For example, the low pressure area above and below an airfoil-shaped extrusion body 1102 may be suited to injection of an electrospray plume. Entrainment air may optionally be taken in from holes at the leading edge of the airfoil-shaped body 1102, and/or the vapor pressure of the plume itself may be employed. The fluid channel 1104 may run the length of the extrusion body 1102 and may feed the nozzles 1106. The clearance holes 1108 may permit the electrospray emanating from the nozzles 1106 to be entrained in passing air. The nozzles 1106 point substantially transverse to the chord of the airfoil-shaped body 1102. In other embodiments, the nozzles 1106 are suitably arranged to point in any direction as established by the geometry of the fluid channel 1104, nozzles 1106, and appropriate clearance areas 1108. The body 1102 may alternatively be a roll-formed shape, or some combination of a roll-formed shape and an extrusion body. Materials other than plastics are contemplated.

Figure 12:
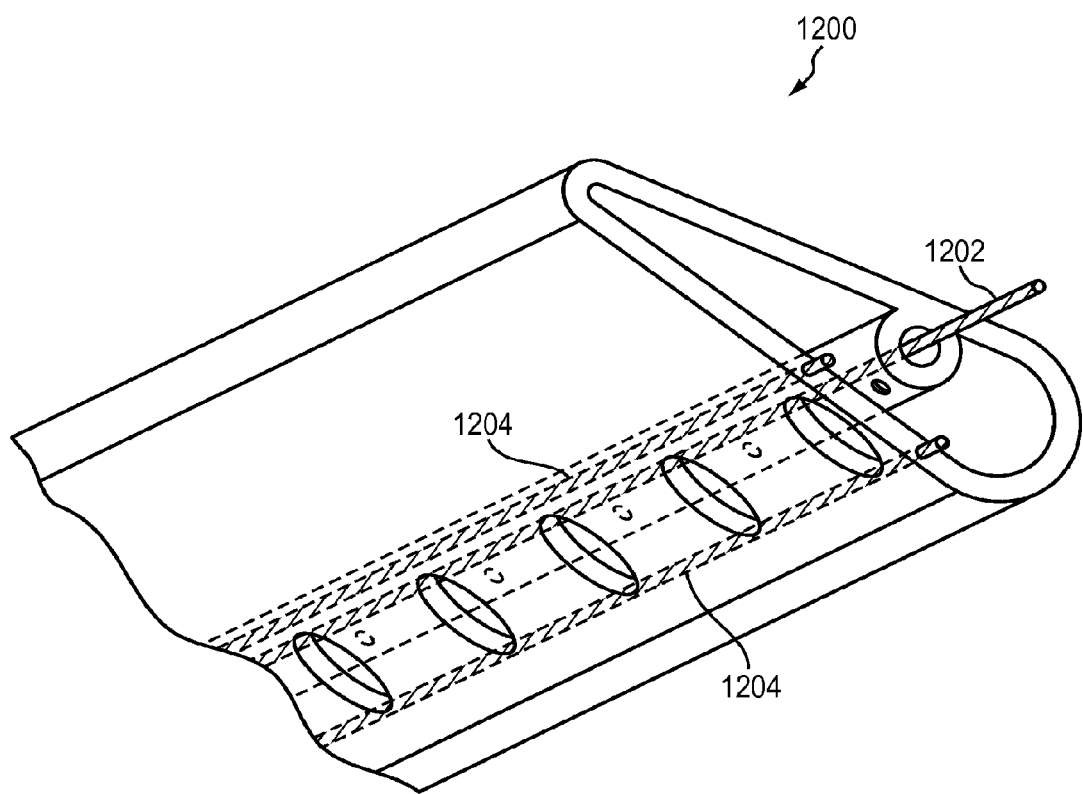

FIG. 12 is a transparent view of an extrusion body 1200, showing additional extrusion elements such as those inserted post extrusion or that are co-extruded. The fluid feed channel accepts insertion of a high-voltage electrode wire 1202 that provides power (current and voltage) to the electrospray fluid. Current from the wire may travel through the fluid to the tip of each nozzle and may be substantially distributed as charge on exiting droplets. Low-voltage electrode wires 1204, here shown as co-extrusions, provide a proper electric field at each nozzle top so that electrospray may occur.

Figure 13:
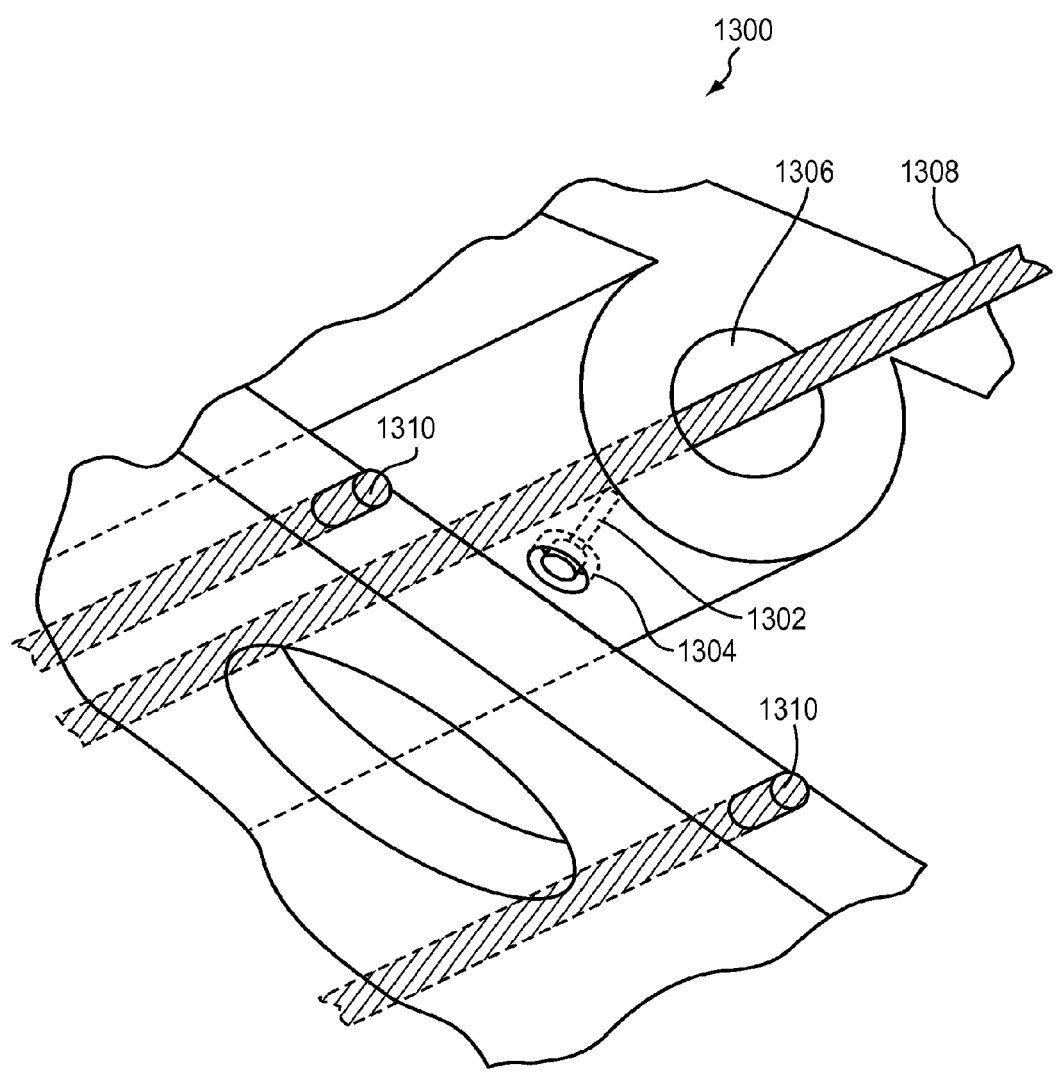
FIGS. 13-14 illustrate nozzle configurations in EHD extrusion bodies in accordance with embodiments of the invention.

FIG. 13 is an enlarged, transparent view of an extrusion body 1300. The fluid channel 1302 of the electrospray nozzle 1304 intersects the main fluid channel 1306. High-voltage 1308 and low-voltage 1310 electrodes are also depicted. The nozzle 1304 may be formed directly from the extrusion body material or may be formed by insertion and/or assembly of a complete nozzle into a receptive cavity in the extrusion body 1300. Such an element might be a stainless steel needle or a plastic needle with dimensions that rise above the contour of the fluid feed channel.

Figure 14:
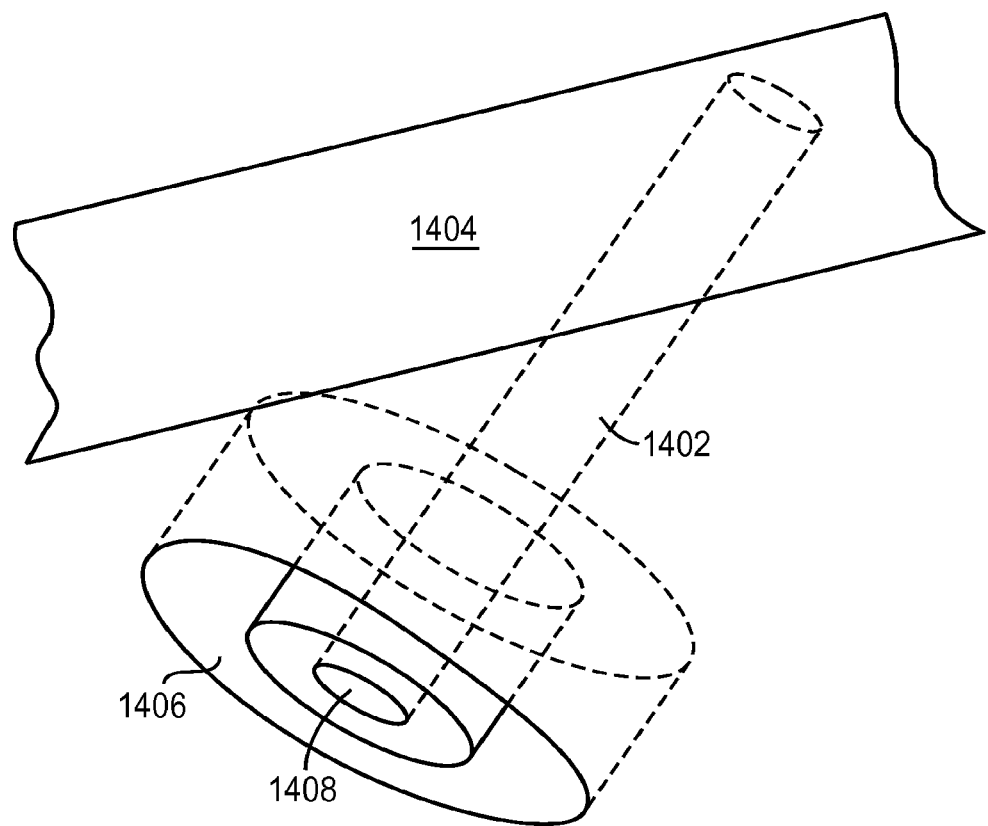

FIG. 14 is an enlarged view of a single nozzle 1400. The nozzle fluid channel 1402 communicates with the feed channel 1404. A relief area 1406 encircles and defines the orifice 1408 of the nozzle 1400. Nozzles 1400 may be defined by first creating a nozzle fluid channel 1402 and then creating the relief area 1406 around the channel 1402. Laser ablation is one process that is suitable for details of this scale and accuracy.

In various embodiments, the nozzle 1400 is constructed from a variety of different components and materials. It may be, for example, a metal needle, such as those produced by New Objective, Inc., of Woburn, Mass.; a plastic cone, such as those produced by Phoenix S&T of Chester, Pa.; a plastic tip, such as those produced by Terronics Development of Elwood, Ind.; a MEMS-type nozzle, such as those produced by Advion, Inc. of Ithaca, N.Y.; a MEMS-type electrospray from sharp tips, e.g., "pencils and volcanoes"; an orifice punched in continuous length fabrications such as extrusions, roll formed metals, or tubes; an orifice formed by inserting a custom feature into continuous length fabrications; and/or an integrated spray atomizer, such as Spray Triode from ZYW Corporation of Princeton Junction, N.J.

Figure 15:
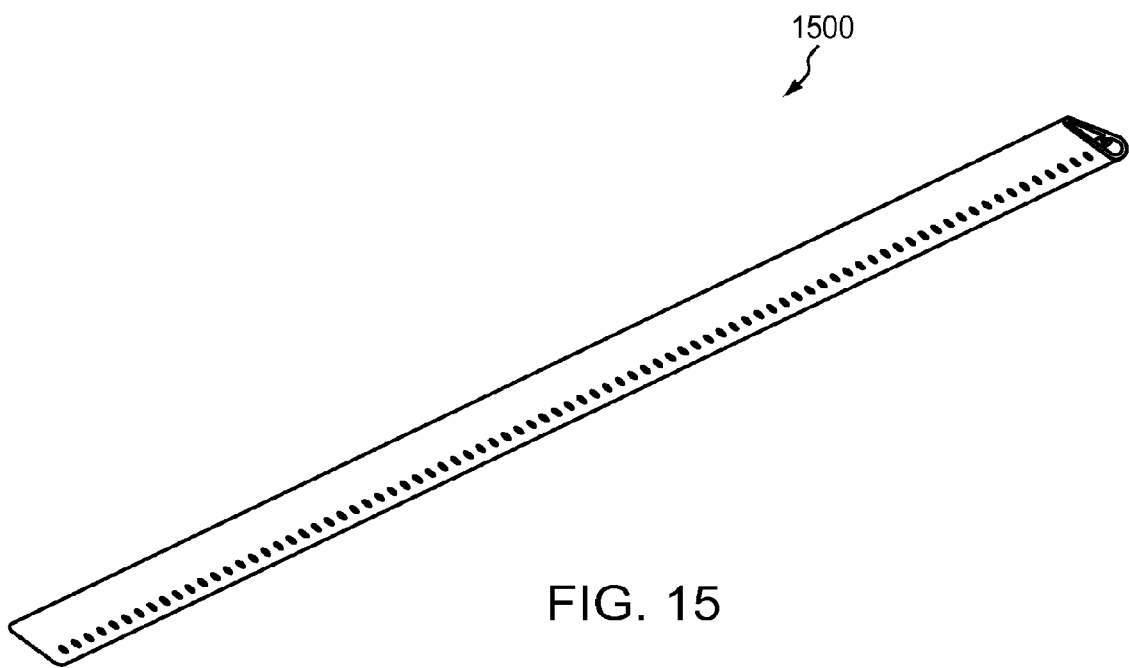
FIG. 15 illustrates an EHD louver in accordance with one embodiment of the invention.
Figure 16:
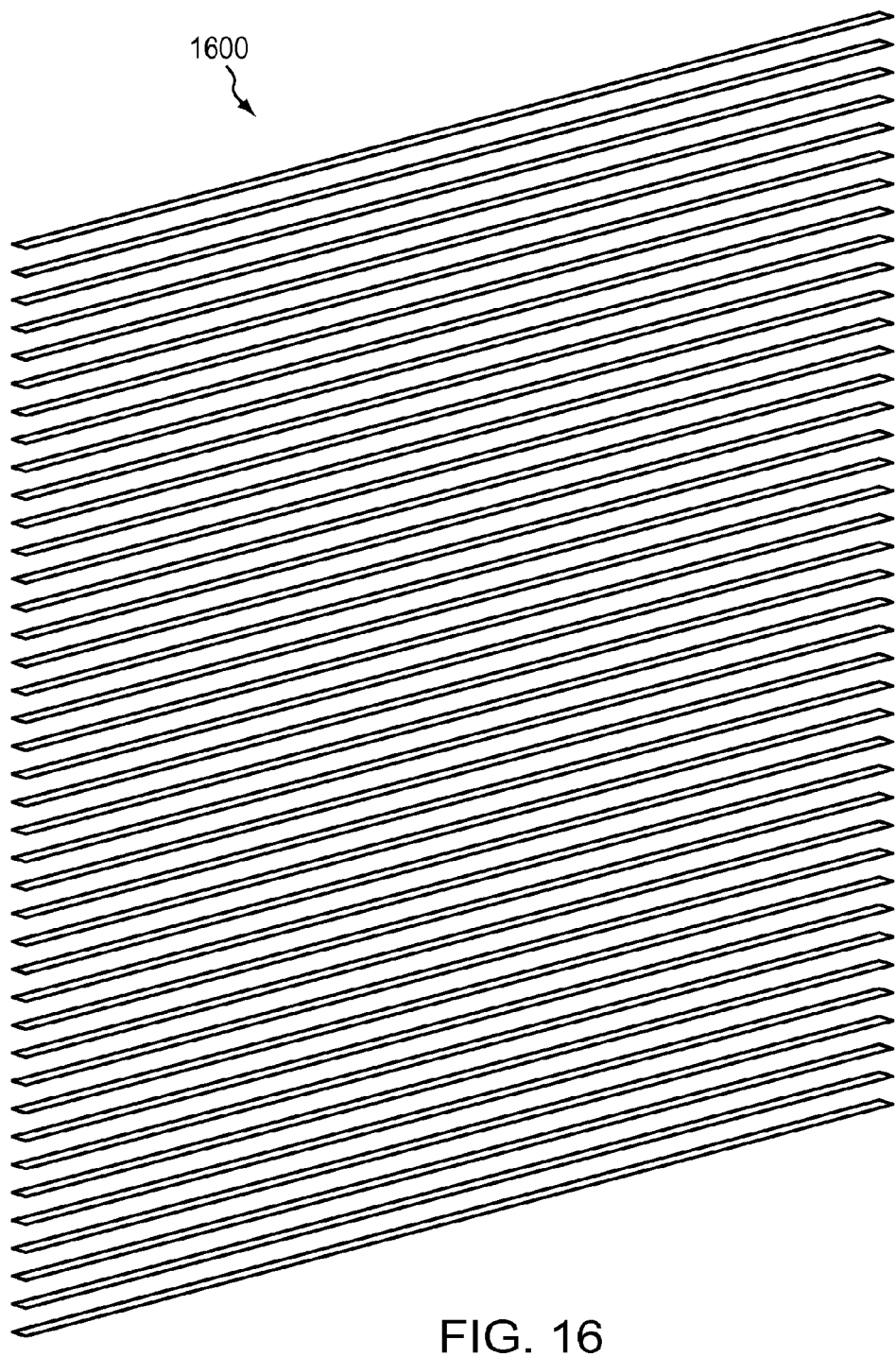
FIGS. 16-19 illustrate EHD louver arrays in accordance with embodiments of the invention.

FIGS. 15 and 16 illustrate a full view of a louver 1500, which may be similar to the extrusion bodies described above, and a louver array 1600. The louver array 1600 is one example of how EHD wind energy conversion may employ one or more electrospray elements, e.g., louvers 1500. The louver array 1600 may have a combined output of approximately 5 kW. While the array 1600 may be substantially vertical, it is understood that the louvers 1500 may be staggered to provide better free flow from downward-facing nozzles. An array with nozzles directed rearward or forward may be arranged in a similar fashion as the array 1600.

Figure 17:
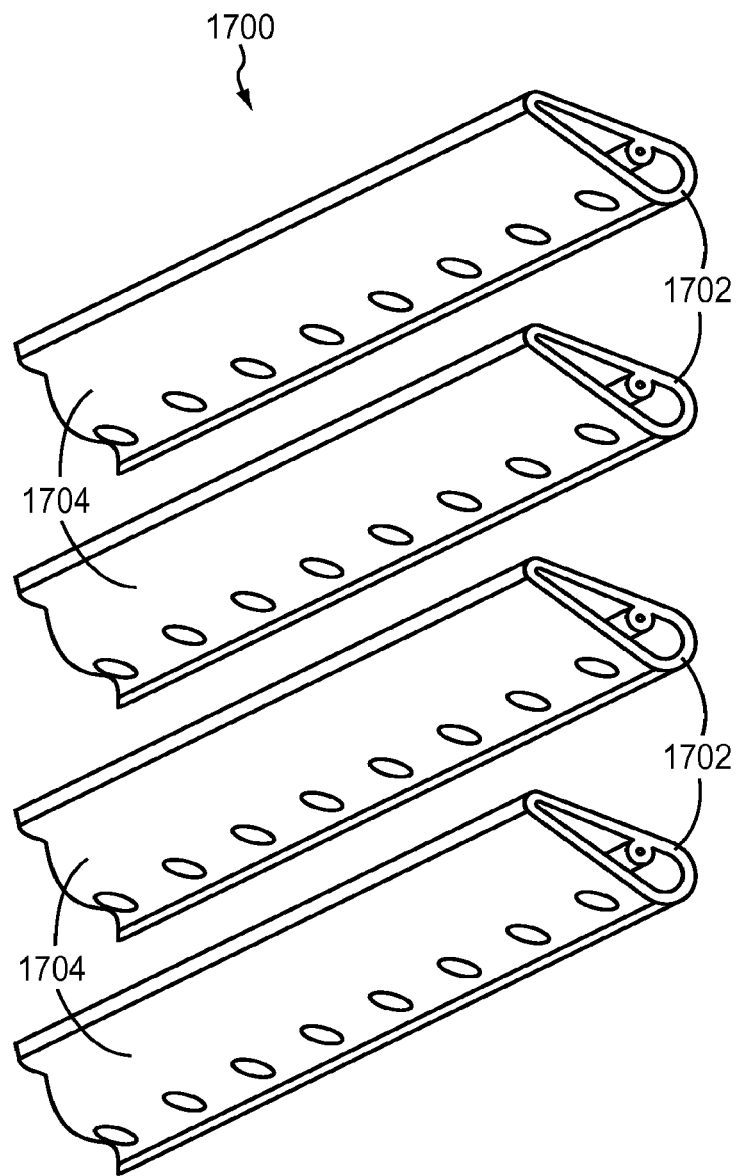

FIG. 17 is an enlarged view of a portion of a louver array 1700. The ends 1702 of each louver 1704 may be open to provide sealing and fastening points for proper fluid, electrical, and mechanical connections. The connections may typically be established with a vertical frame element.

Figure 18:
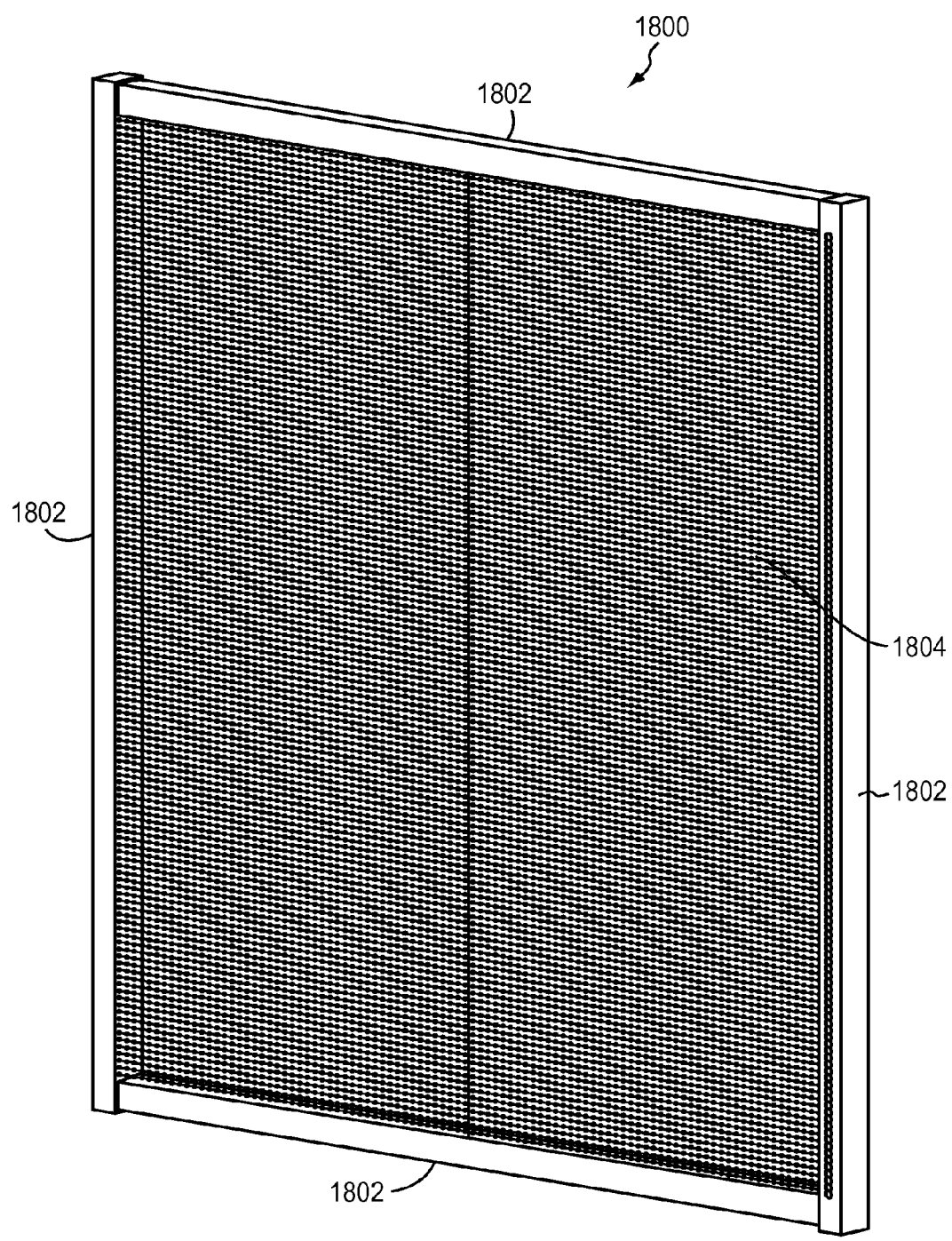

FIG. 18 illustrates a framed louver array 1800. Rigid frame elements 1802 constrain and support the louver array elements 1804. The frame elements 1802 may also provide the appropriate fluid connections for the electrospray as well as electrical contacts for high- and low-voltage elements. The fluid elements may include pressure and flow control. The electrical elements may provide voltage and current control. Control elements such sensors, pumps, and power supplies may be either internal or external to the frame elements 1802.

Figure 19:
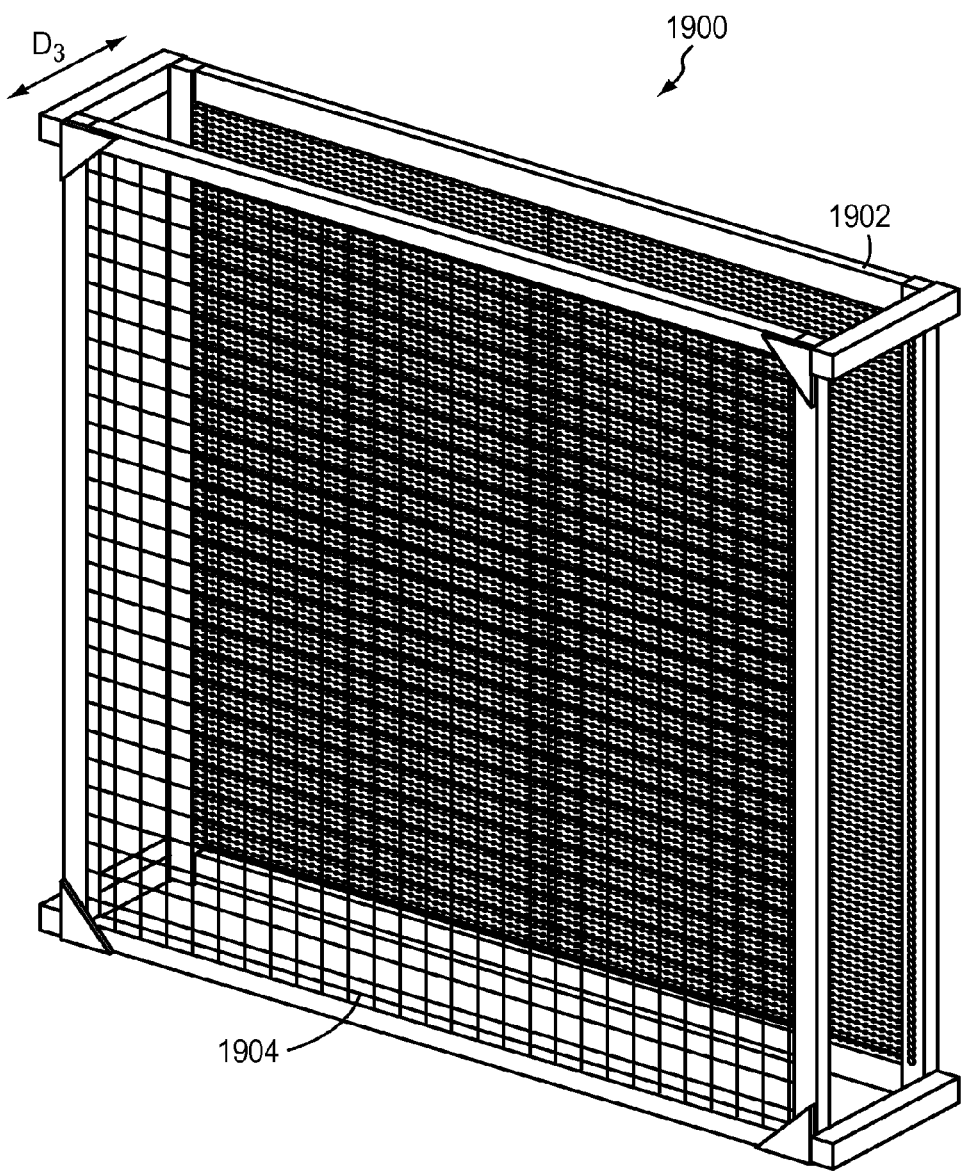

FIG. 19 illustrates an EHD system 1900. The system 1900 includes an upstream louver array 1902, including electrospray elements, and a downstream collector grid 1904. The downstream collector 1904 may be connected to ground. The spacing $D_3$ between the louver array 1902 and the downstream grid 1904 may define the magnitude of the electric field between them.

Figure 20:
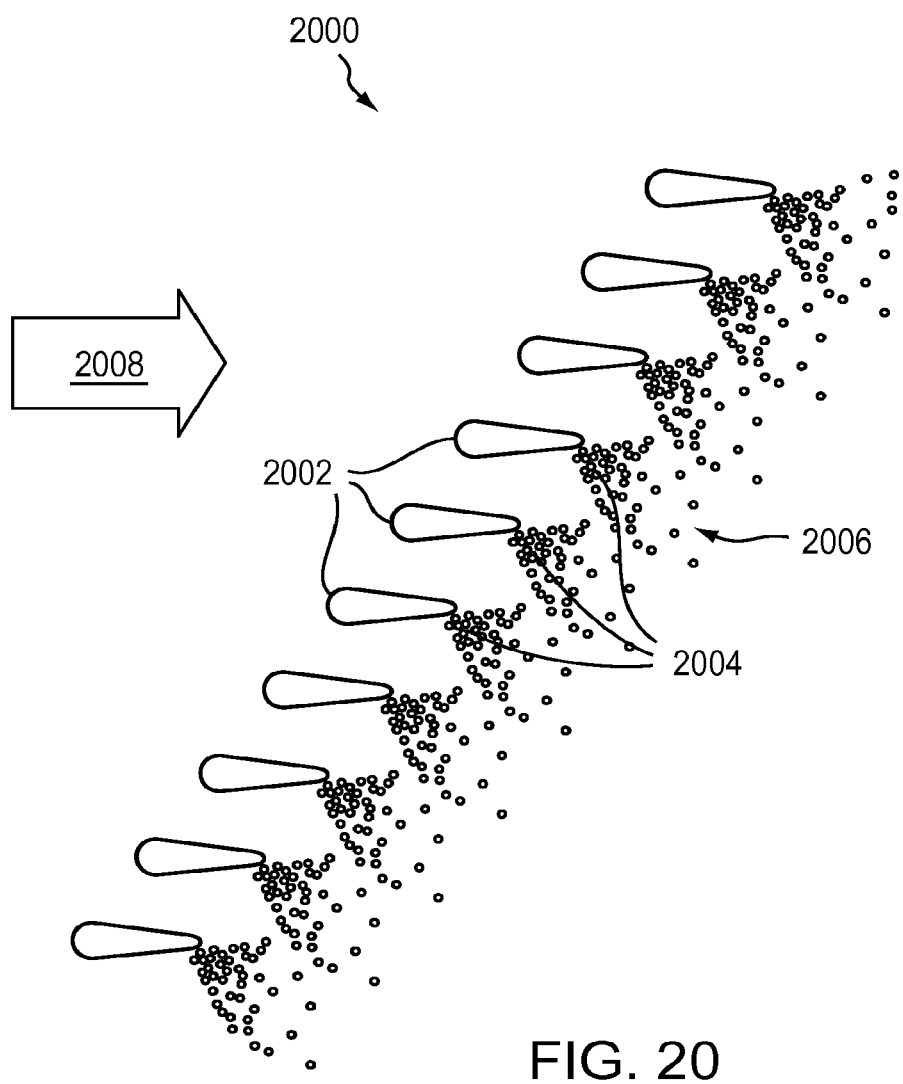
FIG. 20 illustrates a staggered EHD louver array in accordance with one embodiment of the invention.

FIG. 20 illustrates cross-sectional view of a louver array 2000 with canted louvers 2002 vertically offset in a downstream direction. Nozzles 2004 on the louvers 2002 face downward. Where nozzles are arranged along an extrusion or louver, nozzles facing straight downward or upward may spray a plume that contacts an adjacent louver. In various embodiments, the louvers 2002 may be offset to permit the electrospray plume 2006 more room to be entrained by the wind 2008. This layout may allow the louvers 2002 to be placed closer together than an array with a vertically aligned layout. Alternatively, the louvers 2002 may be staggered, in a zig-zag pattern, or any other layout that permits relatively close nesting while providing adequate plume and wind interaction.

FIG. 21 illustrates an injection system 2100 having an alternative electrode configuration. An asymmetric electrode 2102 is disposed closer to the wind 2104 than an electrospray nozzle 2106. Because the electrospray nozzle 2106 is transverse to the wind 2104, droplet forces may be asymmetric with respect to the central spray axis 2108. This asymmetry may be exploited to keep droplets 2110 away from the electrode 2102 by placing the electrode 2102 upwind from the nozzle 2106. The electrode 2102 may include one or more wires; a single wire may be sufficient to create an electrospray field and a Taylor cone 2112 at the tip of the nozzle 2106. The wind 2104 may assist in preventing the electrospray 2110 generated by the Taylor cone 2112 from shorting to the electrode 2102. Wire symmetry is not required. In one embodiment, the electrode 2102 is an asymmetric, coated wire with a current leakage path. A small patch of removed insulation 2114 may help to prevent charge neutralization on the surface of the wire-type electrode 2102.

In another embodiment, at lower wind speeds where there is not enough drag to keep charged droplets away from the charging electrodes, it may be advantageous to coat the bare electrode with a dielectric substance that retards the short-circuiting of droplets. A too-thick coating, however, sustains electrospray only briefly before the coating becomes covered with neutralizing charge, thus eliminating the driving electric field and shutting down the electrospray. A proper coating thickness enables some current leakage from the ensconced wire, preventing field neutralization while at the same time providing sufficient barrier to a current short between spray source and electrode. Another means of preventing driving field shutdown when using coated wire is to provide a small current leak path in the insulation. A small cutaway of insulating barrier provides a path for counter-ions to neutralize charge buildup on the coating surface.

In another embodiment, control of a short circuit current to the nozzle electrode may also be accomplished by a current regulating circuit. A circuit of this type may replace or augment the current-limiting properties of a coated wire or a coated wire with cutaway. A related means of controlling current leakage between electrode and nozzle is to employ an ion permeable material as an electrode coating. To the extent that permeability is regulated by membrane structure, the leakage current may be modulated.

EHD Applications

EHD wind energy conversion may be limited by the amount of ions that can be put into the air, not by fear of mechanical destruction, and thus may withstand arbitrarily high wind speeds. An ion source may be sized to suit expected wind conditions in order to optimize cost vs. energy output. Because wind speeds may increase logarithmically with altitude, the higher off the ground a wind system is mounted, the more energy it may produce. EHD wind energy capture is well-suited to higher wind speeds, including those well above the normal cut-out or maximum power speeds of conventional turbines. In fact, an EHD system may be lifted to arbitrarily high altitudes to capture wind energy at velocity regimes not generally suitable for safe conventional turbine operation.

Traditional determination of available wind energy applies to EHD wind energy conversion. Each charged particle acts like a small wind bucket as neutral wind molecules strike it and force the particle against the electric field. Trillions of ions retard wind speed just like a wind turbine blade as kinetic energy from the wind is converted into electrical energy. Therefore, maximum theoretical available energy (at 100% machine efficiency) is determined by the traditional Betz' Law:

$$\text{Power available} = (16/27)\times 1/2\times(\text{air density})\times(\text{area})\times(\text{wind velocity})^3 \tag{4}$$

Modifications to this equation may provide more realistic results. For example, a charge space composed of positive ions may expand due to mutual charge repulsion. This expansion may cause the charge space to occupy a larger swept area than just the collector. Conversely, collisions between neutral air molecules and the ions are not perfectly elastic and thereby result in friction losses.

Figure 22:
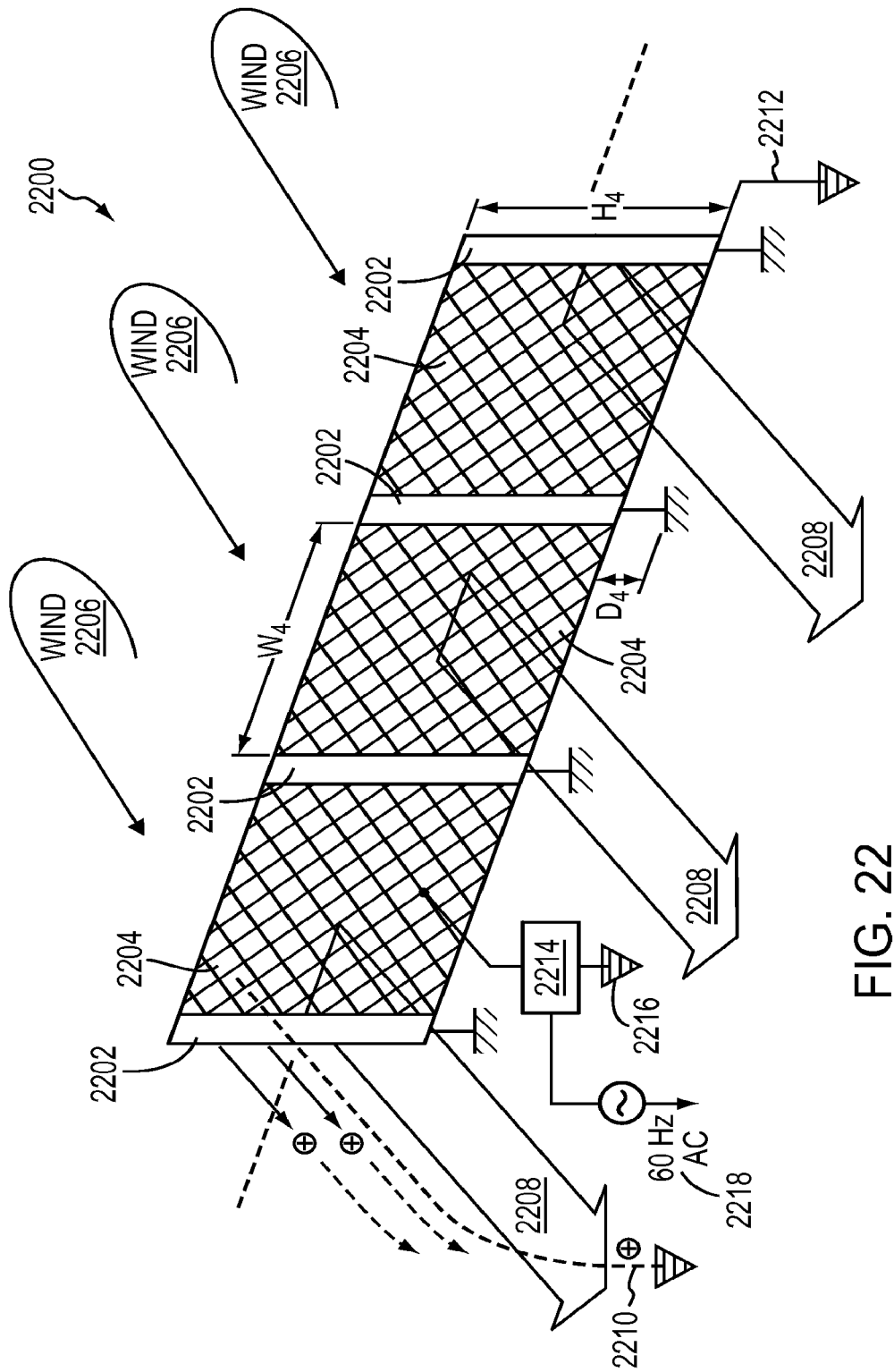
FIG. 22 illustrates a ground-based EHD system in accordance with one embodiment of the invention.

FIG. 22 illustrates one embodiment of a ground-level-mounted EHD system 2200. Columnar ion sources 2202 provide (in this embodiment) positive ions, which may induce a voltage in a porous collector fence 2204. Each collector panel 2202 may have a height $H_4$ and a width $W_4$. Other embodiments may have more or fewer ion sources 2202 and/or collector fence panels 2204. The ions may be driven by the wind 2206 against the voltage gradient created by the charge space 2208 between the fence 2204 and ground 2210. The ions may return to ground 2210 to complete the virtual circuit. The ion sources 2202 may be electrically isolated from the collector 2204 and may have their own ground 2212. The collector 2204 may have no ground, per se, because its voltage is controlled by a voltage controller 2214. The controller 2214, which also may have its own ground 2216, may also convert electron flow (current) from the collector 2204 into a line voltage 2218. The collectors 2204 may be raised above ground level by distance $D_4$ to prevent shorting the collector 2204 to ground 2212. Electrical isolation may protect the collector voltages, which may reach several hundred kilovolts. Distance $D_4$ may be increased to allow the collectors 2204 to be exposed to higher average wind velocities. In one embodiment, the collector 2204 is a porous, conductive fence, such as a chain-link fence, with an ion source and a means of conditioning the voltage and current induced in the fence.

Figure 23:
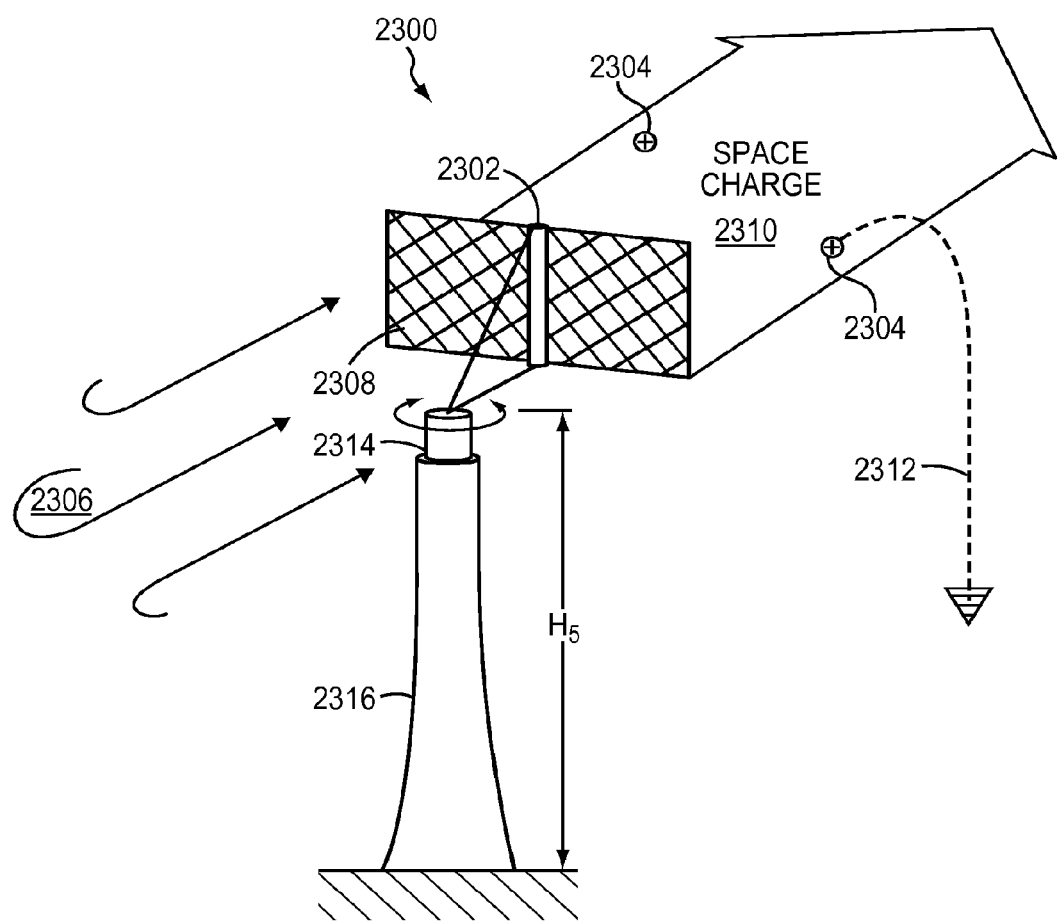
FIG. 23 illustrates a tower-mounted EHD system in accordance with one embodiment of the invention.

FIG. 23 illustrates one embodiment of a tower-mounted EHD system 2300. In general, increased height implies increased wind speed, at least because ground effects slow down the wind and rob it of energy. Given a first wind velocity $V_0$ at a first height $H_0$, the new velocity V at a second, higher height H is:

$$V = (H/H_0)^\alpha V_0, \quad (5)$$

where α is a wind shear exponent. Although the wind shear exponent may vary with terrain, it is generally accepted to be ⅐ (0.143). For example, a velocity of 5 meters/second measured at a height of 3 meters is becomes 7.36 meters/second at a height of 150 meters. Furthermore, wind power increases as the cube of wind velocity ($V^3$). Combining the two expressions, there may be twice as much wind energy available at 100 feet above ground than there is at 20 feet above ground.

An ion source 2302 emits positive ions 2304 into the wind 2306, thereby inducing a voltage in a collector 2308 due to a space charge 2310. The ions may return to ground 2312. In the tower mount, the collector 2308 may be placed on a pivot 2314 that permits the wind to push the collector 2308 downwind from the tower 2316. The system 2300 may also include voltage conditioning and grounding means.

The height of the tower $H_5$ may be arbitrary. In one embodiment, $H_5$ is over 100 meters. Given that EHD systems have no moving parts, no gearbox, and no generator, the support tower 2316 may bear less significantly weight than a conventional wind turbine tower, and thus may be less massive for a given height. Maintenance may involve checking the cleanliness of the collector grid, the soundness of electrical connections, and/or sensing the integrity of coordinated power and control systems. The rotary bearings at the top of the tower may have to be checked and lubricated. Larger systems may use a servo-motor to drive the collector grid to the proper orientation or employ a tail sail to orient correctly to the collector 2308.

Figure 24:
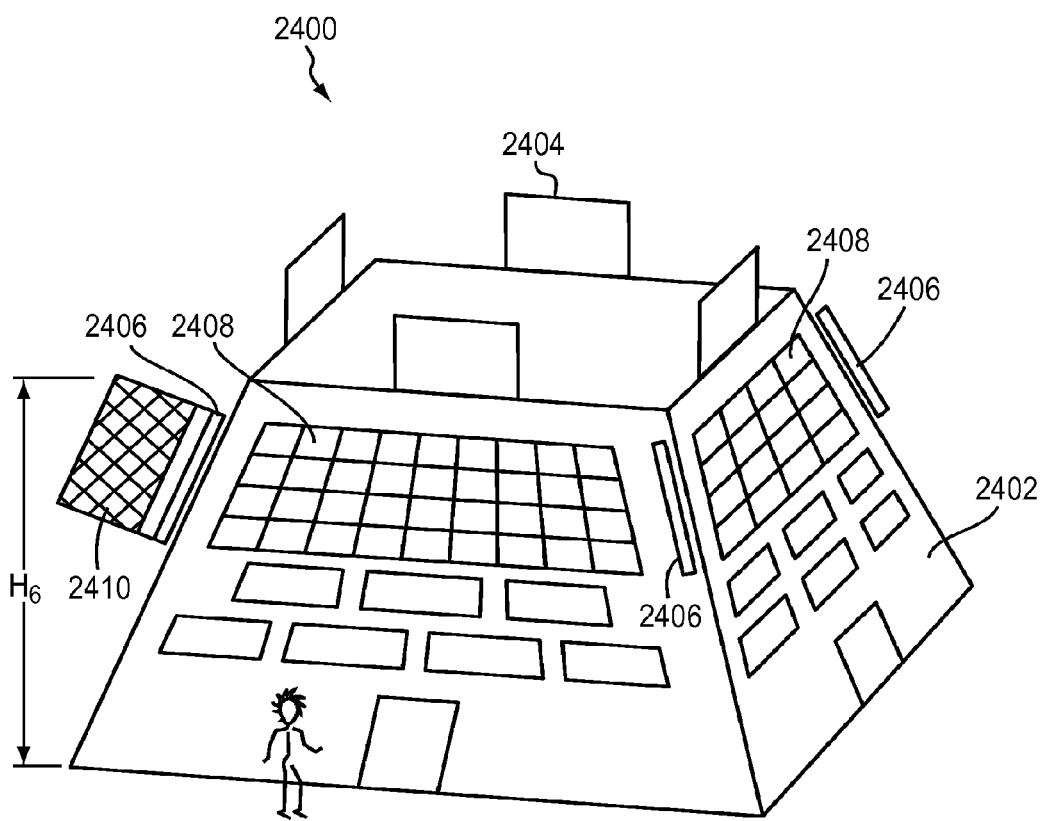
FIG. 24 illustrates a building-mounted EHD system in accordance with one embodiment of the invention.

FIG. 24 illustrates a building-mounted EHD system 2400. A building 2402 of height $H_6$ has EHD system collectors 2404 mounted on its roof. Ion generators 2406 may be mounted on the corners of the building 2402, and collector grids 2408 may be positioned parallel to the four outside surfaces of the building 2402. In operation, the wind may produce electrical energy from the roof systems as follows. Wind passing around the corners of the building 2402 may pick up ions, create a charge space, and induce a voltage into the collectors grids 2408. Of concern is turbulent back-flow on the downwind walls of the building 2402 which may permit ions to rejoin the collector grids 2408 without experiencing the effect of the wind. This effect may be minimized by placing the collector grids 2408 remote from the mid-portions of the wall, i.e., more near the corners of the building 2402. The collector grids 2408 may also be positioned to extend straight out from the corners, as shown by collector grid 2410.

Other manmade structures, such as the roof peak of a home, may experience wind velocity magnification due to the slope of the roof. Such locations may be advantageous for installation of an EHD wind energy system. Such a system may have a collector that is long and narrow to suit the high-energy ribbon of air flowing over the peak.

In one embodiment, an EHD system may be mounted on a flagpole. The light weight of a simple, porous collector mesh may not cause undue stress on the flagpole. It may be mounted on the top with, e.g., a gimbal comparable to the tower-mounting scheme. Electronics could be placed at the bottom of the pole.

In general, the dimensions of the collector area may not be strictly defined. Unlike the strictly circular path of a horizontal axis, bladed wind turbine, or the columnar profile of a vertical axis Darrieus wind turbine, an EHD system collector need only heed the geometric requirements relative to a charge field. For example, the collector area may be long and thin rather than square or round. This geometric flexibility permits integrative designs to take advantage of unique wind flow characteristics, such as around the corners of high buildings. It also provides some measure of artistic license to create aesthetically-pleasing designs.

In alternative embodiments, EHD systems may be mounted on natural structures such as trees, boulders, and/or mountains. For more delicate structures such as trees, a small and/or lightweight EHD system may be used. On large, sturdy structures such as mountains, larger EHD systems may be used. Wind speed near the ground at the top of a mountain can be quite high. To capture this wind energy, in one embodiment, a fence-type system may be used. Because an EHD system may naturally produce high-voltage DC power, transporting power long distances may be less of an issue. In one embodiment, AC power is converted to DC power.

Figure 25:
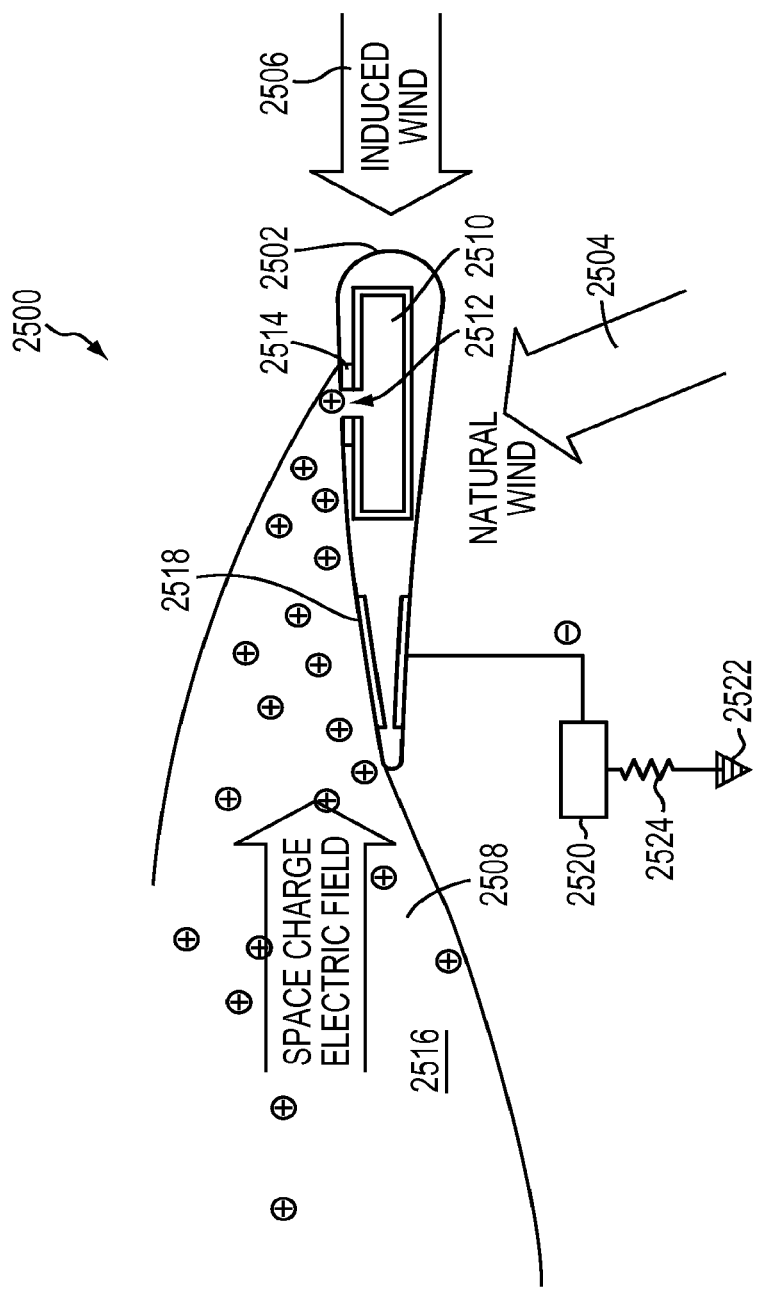
FIG. 25 illustrates an airfoil-mounted EHD system in accordance with one embodiment of the invention.

FIG. 25 illustrates one embodiment of a portion of a turbine-blade EHD system 2500. An existing, conventional wind turbine may benefit by integrating an EHD system with the turbine blade. Current EHD designs may enhance the efficiency of the conventional wind turbines, and new EHD designs may dispense with conventional wind turbine components, such as the generator and, if employed, the gearbox. In one embodiment, an EHD system may be retrofit from a conventional wind turbine.

The airfoil 2502 may act as a mechanical wind-velocity enhancer. The airfoil 2502 is driven by the natural or ambient wind 2504, as a blade of a wind turbine may be driven. The airfoil 2502 experiences a relative or induced wind 2506 affected by the motion of the airfoil 2502 through the air. A volume of charged particles 2508 may be created as an ion-rich region by an ion generator 2510, such as an electrospray source, a microwave Electron-Cyclotron Resonance ("ECR") waveguide ion generator, or other suitable ion source. Ions exit the ion generator 2510 through a waveguide slot 2512 near the leading edge of the airfoil 2502 and may be prevented from returning by paired magnets 2514 at the exit of the slot 2512 and/or by positive gas (i.e., air) flow out from the slot 2512. The charge space 2508 is porous to the induced wind 2506 which blows through and among the charged particles, driving them by hydrodynamic coupling in a direction generally the same as the induced wind 2506 direction. The charged particles are therefore moved in a direction opposite to the space charge electric field 2516 created by the collector plate 2518 mounted near the trailing edge of the airfoil 2502, which may be charged with a polarity opposite to the ion charge. As the ions are driven away from the collector plate 2518, the plate voltage may be maintained by a voltage regulator 2520 with respect to ground 2522. As work is performed on the space charge 2508 by the induced wind 2506, excess charge may be built up in the collector plate 2518. The voltage regulator 2520 may bleed current from the collector 2518 to maintain constant voltage. This current may be passed through a load 2524 to perform useful work.

The collector plate 2518 may be charged to higher voltage than collector plates of non-airfoil systems, because ion mobility back to the collector 2518 may be overcome by the higher relative wind 2506 velocity. The volume of air passing the ion release zone may also be increased, thereby releasing higher ion densities than in non-blade systems.

The relative wind 2506 velocity over the aerodynamic surface of the airfoil 2502 is typically several multiples (e.g., 4× to 10×) of the bulk wind 2504 velocity. Airfoil shapes may be optimized for combined (mechanical wind plus EHD) energy extraction, or optimized for EHD alone. In one embodiment, an airfoil for EHD-only extraction may not require a central generator. Instead, the blades of the windmill freely rotate about a generally passive axis and may extract energy from the wind at the blades themselves. Such an approach may be able to extract wind energy at wind speeds both lower and higher than conventional wind turbines.

In addition, the placement of the collector plates 2518 and the components 2510, 2512, 2514 that make up the ion generator is schematic and exemplary. Placement of the items may take a different form. For instance, the ion generator assembly 2510, 2514 may be placed at the root of the blade, and the ions ported up the core of the blade and suitably dispersed with respect to the collector plate 2518. Alternatively, the collector plate 2518 may be placed on the underside of the blade, thereby reducing neutralization by proximal positive ions. In one embodiment, a series of collector fins is extended into the air stream to provide a higher collection surface.

Integration of an EHD system with an airfoil may benefit the efforts of conventional wind turbine manufacturers, such as Sky Windpower Company of Ramona, Calif. Their approach is to use autogyro rotation of lift blades to support a wind energy platform at height. The instant invention may lower the weight for any existing design and thereby improve energy conversion efficiency.

One embodiment of the airfoil-integrated EHD system design employs the airfoil on an aircraft. When the EHD system is deployed, it may act as an air brake. Ions seed the air behind the wing, the collector creates a space charge, and the ions want to migrate back to the collector. Each ion acts like a micro air brake as it bounces against oncoming neutral air particles. As the ions are forced away from the wind by air flow, the collector registers high voltage; current drawn off from the collector is stored onboard for use another time. Energy conservation and efficiency are important for nearly every kind of aircraft; an EHD system air brake is especially valuable for electrically powered aircraft.

In various embodiments, EHD systems may be used with kite-based wind energy systems, which are being actively researched by such companies as Makani Power of Alameda, Calif. Sky Windpower also contemplates using devices to lift turbines and generators in the air without a tower. Replacing a standard generator system with an EHD system may increase their efficiency. Less energy is wasted on lift, and more converted to electricity. Kite-based power generation may yield improved wind speed with increased height. A kite can achieve great heights without a tower, and power may be conveyed along the kite tether.

The details of integrating an EHD system with a kite follow. In general, ions are introduced upstream of the kite's lifting surface, and one or more of the kite lifting surfaces may be rendered conductive in order to act as a collector. Energy is conveyed to ground with a tensioned tether, and the collector voltage may be readily conditioned to whatever form is necessary. The tether may be reeled out from a spool that converts the imparted rotational energy by using it to power, for example, an electrical generator. When the kite is reeled in, it may reduce its wind profile and thereby allow the spool to consume less energy than was captured in the reeling-out step.

Figures 26A, 26B:
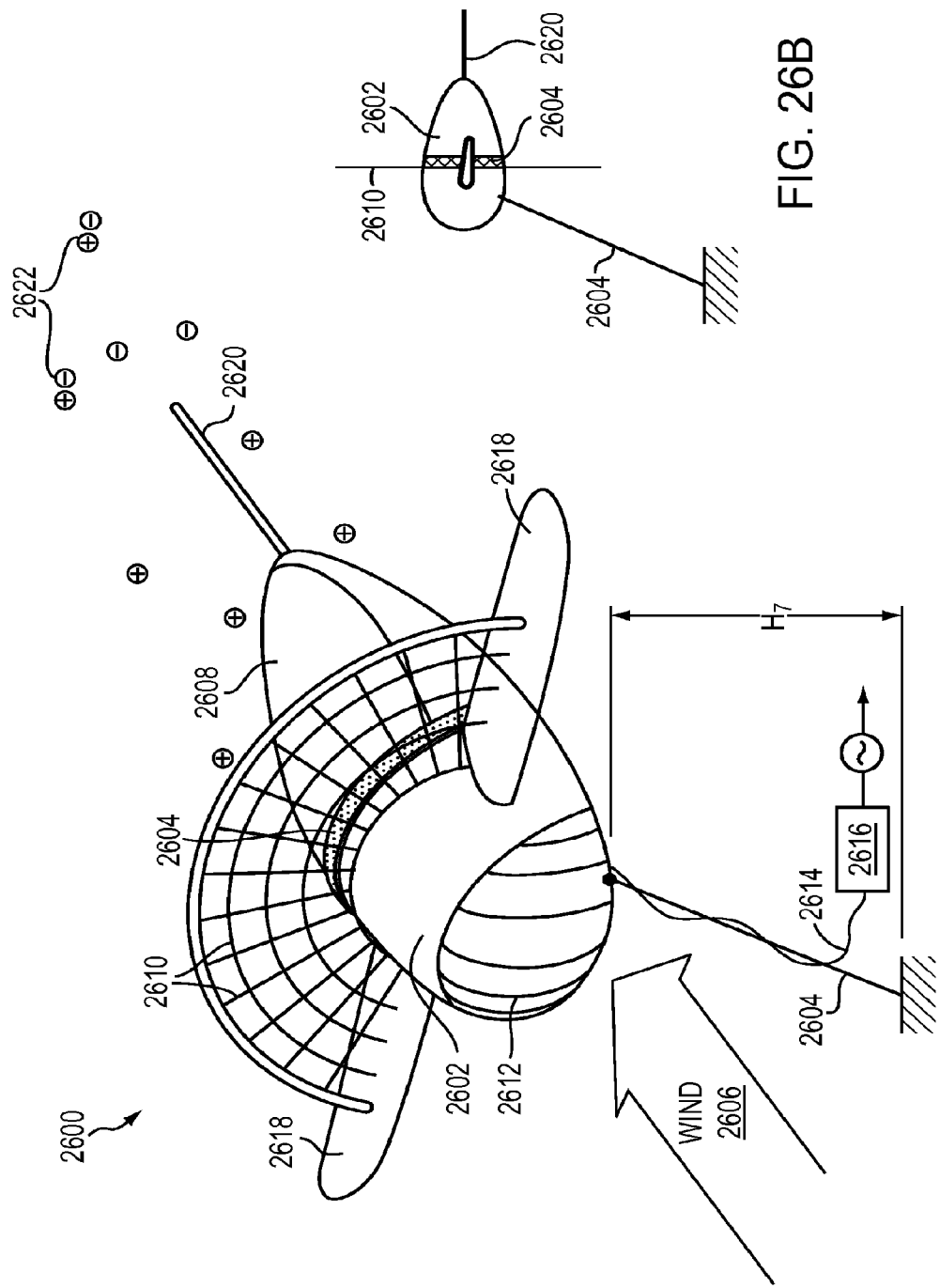

FIGS. 26A-B illustrate a lighter-than-air ("LTA") EHD system 2600. Integration of EHD energy generation with an LTA vehicle may offer the same advantages as a kite-based EHD system, namely, placing the EHD system at a height that captures more wind energy than it would on the ground. Unlike a kite-based system, however, an LTA system may be sized to very large dimensions and/or be deployed at very high altitudes. In addition, LTA systems that use conventional generators, such as those produced by Magenn Power Inc. of Canada, may benefit from the inclusion of an EHD system.

FIG. 26A illustrates an LTA vessel 2602 that may be a pressurized container, such as a helium- or hydrogen-filled balloon or dirigible. The surface of the vessel 2602 may be semi-rigid and/or rigid at specific attachment points. The vessel 2602 may be anchored to the ground by a tether 2604 at a height $H_7$. An ion source 2604 may be positioned circumferentially at the line of highest wind velocity, and ions may be released into the wind flow 2606 to create a space charge. The collector may be disposed on the surface 2608 of the downwind end of the vessel 2602 and/or may be a porous net 2610 positioned near the ion release line 2604. The nominal displaced area of the system is the front-on displaced area 2612 of the vessel 2602 that forces enhanced flow around the periphery. The area 2612 may be increased by adding collector surfaces such as the porous net 2610. Conditioned power may be returned to earth along an anchor cable 2614 and further conditioned by a regulator 2616 to a suitable line voltage and frequency. A lifting force may be supplanted by wings 2618, which may improve the angle of the tether cable 2604 with respect to ground. As shown in this embodiment, the wings 2618 form part of the secondary collector plate support system. Negative ions, produced by the ion generator 2604, may be injected into the downstream air to neutralize the positive ions. The counter-ion injection downstream may therefore complete the electrical circuit at altitude rather than relying on a ground circuit. In one embodiment, the downstream counter-ion injection system is a pipe 2620 releasing electrons that neutralize the positive free ions 2622. FIG. 26B illustrates a reduced-sized side view of the LTA vessel 2602.

LTA/EHD systems may be capable of reaching heights in excess of 30,000 feet, which is high enough to be inside the jet stream and take advantage of its high wind speed (120 mph or greater) and constancy. For example, even accounting for lessened air density, a 120 mph air stream may theoretically yield approximately 24 kW per square meter. For comparison, typical wind speeds at sea level may yields only 0.109 kW per square meter.

In various embodiments, an LTA-based EHD system may be combined with a kite-based system. For example, a kite-based system may use a lighter-than-air portion to create slightly positive buoyancy. Such a system may be easier to launch in quiescent low-level winds.

Figure 27:
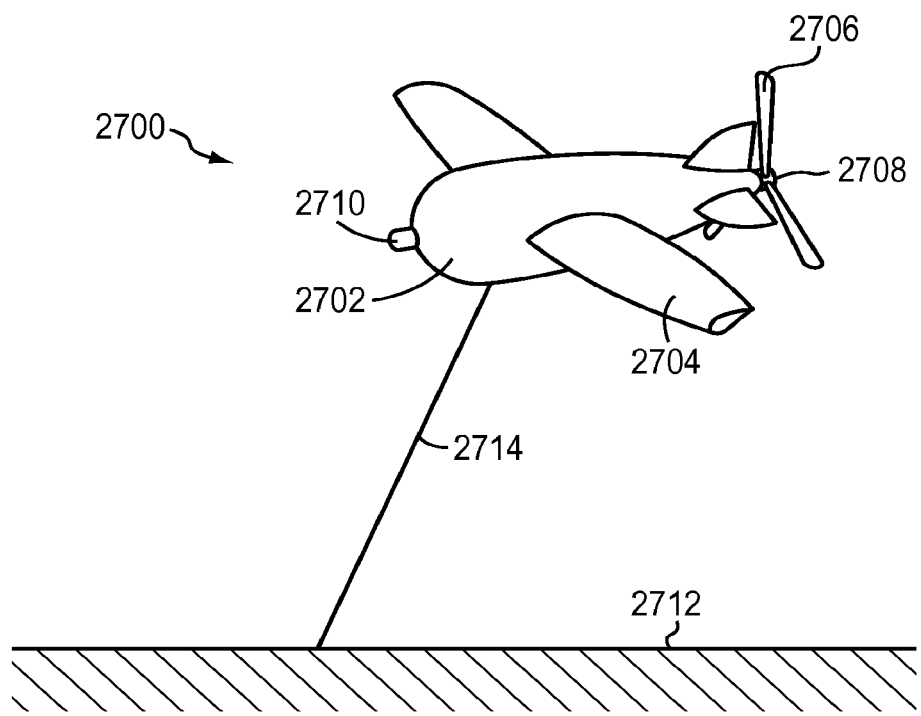

An LTA/EHD system may have less weight than a conventional high-altitude wind-energy-conversion system ("WECS"). Conventional high-altitude systems (such as LTA-only or airfoil-only systems) require lifting turbine blades (or equivalent), gearbox, and generator to the required height and sending power back to ground. Because LTA/EHD systems may not require some or all of these components, their overall weight may be much lower. Furthermore, lift is fixed by the buoyancy of a solely-LTA device, and the angle of incidence of the tether with respect to ground is determined by the lift to drag ratio. Additionally, a fixed-lift LTA device heels as wind speed increases. An airfoil-only device requires wind of finite and significant velocity in order to launch from the ground FIG. 27 illustrates one embodiment of an LTA/EHD system 2700. An LTA structure 2702 of conventional shape is combined with a rigid airfoil 2704. The airfoil 2704 has a lift to drag ratio ("L/D") characteristic of an efficient design. At the downwind end of the LTA structure 2702 is a turbine blade set 2706 linked to a gearbox 2708 that then communicates through an internal shaft to a generator 2710 at the upwind end of the structure 2702. The system 2700 is connected to ground 2712 through a tether 2714 that may also communicate signals and power between the system 2700 and ground 2712.

As depicted, the turbine 2706 is at the aft end of the LTA structure 2702. In other embodiments, single or multiple turbines may be placed at any of a variety of attachment points along the body of the LTA structure 2702.

In addition, a plane of energy extraction may be provided by any device that extracts energy from the wind, and may be similarly placed at a variety of points on the body of the LTA structure 2702. For example, one or more WEC systems may be placed on the LTA structure 2702 to deploy charged water droplets in an electric field and convert wind energy directly to electrical energy. Larger WEC systems may support multiple planes of energy extraction.

Because the buoyant portion of the system 2700 is sufficient to lift it into the air, the system 2700 may be deployed at zero wind velocity. Winds at higher altitudes are likely to be higher than winds at ground, not only because of wind shear, but also because obstructions such as trees, hills, and buildings tend to block wind at ground level. Once lofted, the airfoil 2704 may provide additional lift.

Figure 28:
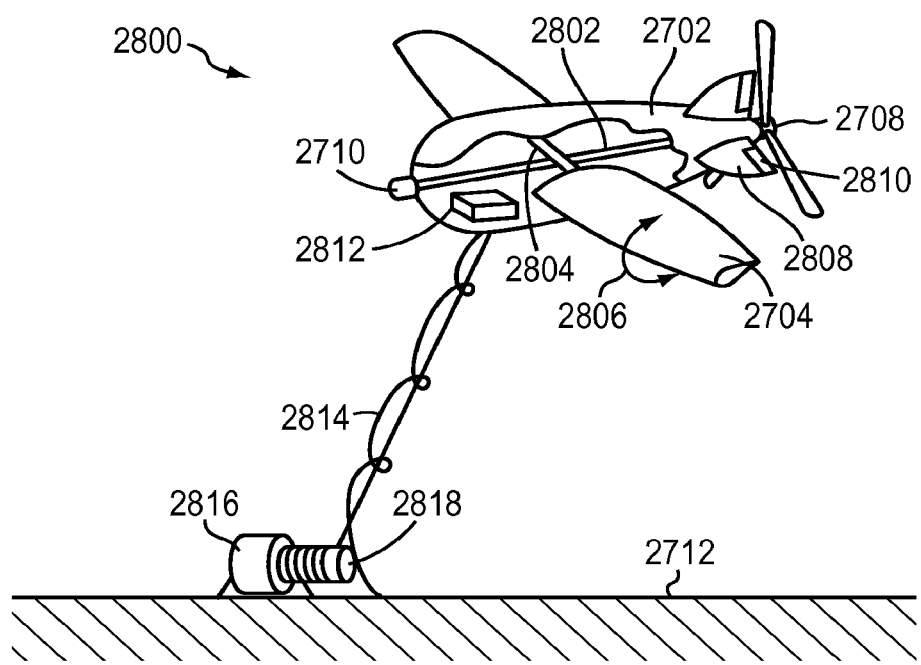

FIG. 28 illustrates a cutaway view of an LTA system 2800, showing a lightweight shaft 2802 connecting the gearbox 2708 to the generator 2710. The airfoil 2704 has actuation means 2804 to adjust its angle of attack 2806 with respect to the wind. The LTA structure 2702 has a steering means in the form of fins 2808 with flaps 2810 that may permit optional positioning of the entire device. During operation, the airfoil 2704 may be angled to provide the optimum amount of lift for a given wind condition while the steering means on the LTA 2702 provides desired positioning. For example, lower wind speeds may require a higher angle of attack 2806 for the airfoil 2704. Turbulent wind, operation in the vicinity of natural or man-made structures, and/or the presence of other aerostats may necessitate steering and stabilization facilitated by the steering means. The control surfaces 2810 and the airfoil angle 2806 may be controlled by an internal guidance system 2812 or manually from the ground through a control line 2814 or wireless means. The guidance system 2812 may additionally be coordinated with adjacent structures 2800 in a multiple-unit wind farm. In such a case, the structures 2800 may be additionally fitted with location devices that mutually communicate aerial position. Guidance systems 2812 within each unit may employ internal control means to safely position the multiple units 2800 with respect to one another and to additionally provide positioning that provides maximized power output for the entire system. A winch 2816 connected to a spool 2818 on the ground 2712 may permit reeling in the system 2800 during inclement weather, for maintenance, and/or to set the proper operating altitude.

In other embodiments, the airfoil 2704 is replaced with any of a variety of structures with suitable L/D ratio, such as, kites, parasails, self-inflating soft airfoils, inflatable wings, fabric ultra-light wings, and the like. The LTA structure 2702 may also be itself shaped like an airfoil, and may include the improvements detailed below.

Figure 29:
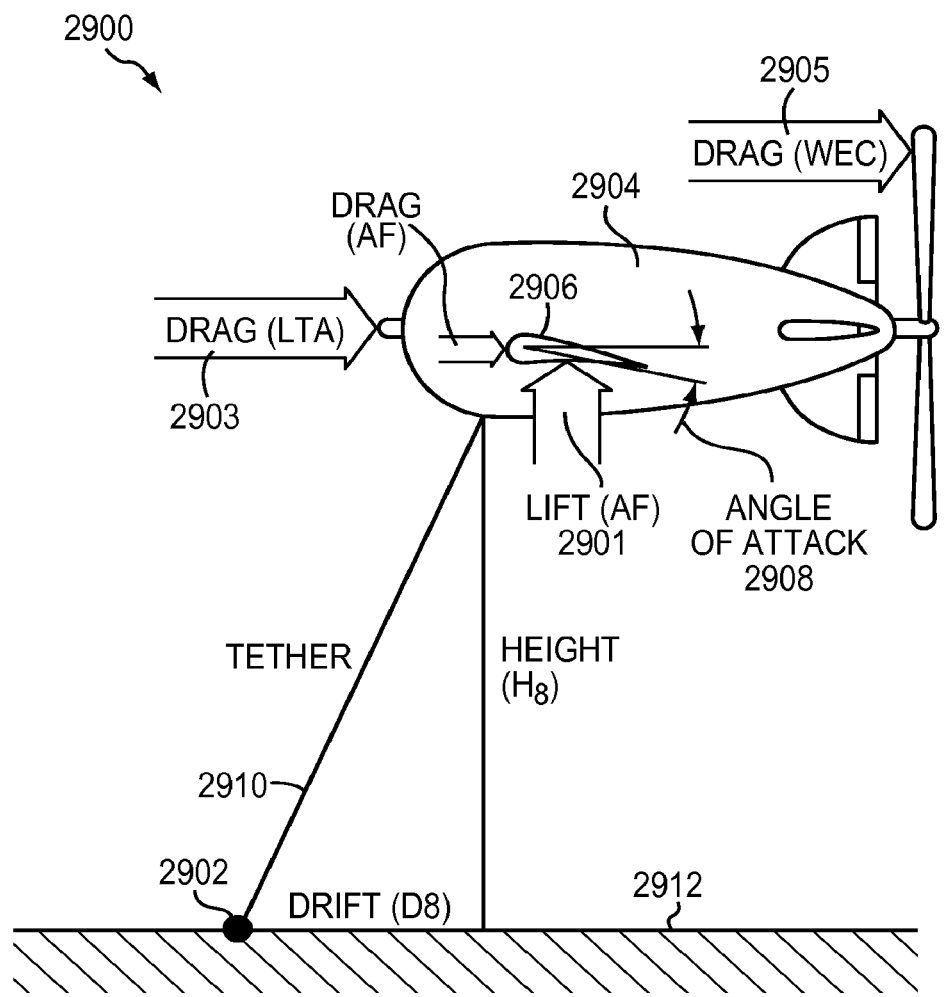

FIG. 29 illustrates a LTA system 2900 its relationships with lift 2901 and drag 2903, 2905. The ratio of lift to drag is essentially equal to the ratio of the height $H_8$ to the distance $D_8$ that the system 2900 is downwind from its mooring point 2902. The system 2900 experiences both drag and lift at the same time. The LTA structure 2904 may provide no lift when facing the wind straight on, unless, for example, it has some type of airfoil shape. In addition, the LTA structure 2904 may cause significant drag in and near the plane of energy extraction. Combined drag may cause the system 2900 to heel over as wind speed increases. The airfoil 2906 has an L/D ratio that depends on angle of attack 2908, which may be controlled by the system 2900. Thus, as wind speed increases and more lift is desired, the angle of attack 2908 of the airfoil 2906 may be changed to compensate for increased drag 2903, 2905. In addition, the angle of the LTA structure 2904 itself may be changed by the steering elements, thus additionally compensating for wind-induced drag effects. All in all, the integrated system is well-prepared to handle a wide variety of wind speeds and destabilizing effects while producing a maximum amount of electrical energy.

In order to optimize the safety and stability of the system 2900 and minimize its labor costs, the system 2900 may include a variety of sensing and feedback means connected to one or more control computers. An inertial-gravimetric system with feedback to the control surfaces may be able to maintain operational stability even under turbulent conditions. A wind-speed indicator may determine boundaries for safe operation, and may automatically cause the system 2900 to be winched to ground, or likewise, deployed.

The tether 2910 may contain signal means to enable communication between the ground and the system 2900. Such communication may permit manual operation of positioning, system monitoring and diagnosis, startup, and shutdown.

The tether 2910 may carry high-voltage, low-current power from the system 2900. A transformer and/or power conditioning system on the ground 2912 may convert captured power to voltage, current, and waveforms suitable for interfacing with ground loads or power grids.

Because the system 2900 has no tower, it has no overturning moment. A simple attachment point for the ground-based deployment and retrievable system provides the necessary base. The base may be mobile, such a base mounted on a vehicle (e.g., a boat) or may mounted to an anchored, floating platform. An advantage of the anchored attachment means is that the depth of the anchor is of minor significance, being limited only by the available length and strength of anchor line. Existing off-shore wind-energy-conversion systems, however, are depth-limited because they must provide an underwater foundation to support a heavier-than-air conversion system.

Figure 30:
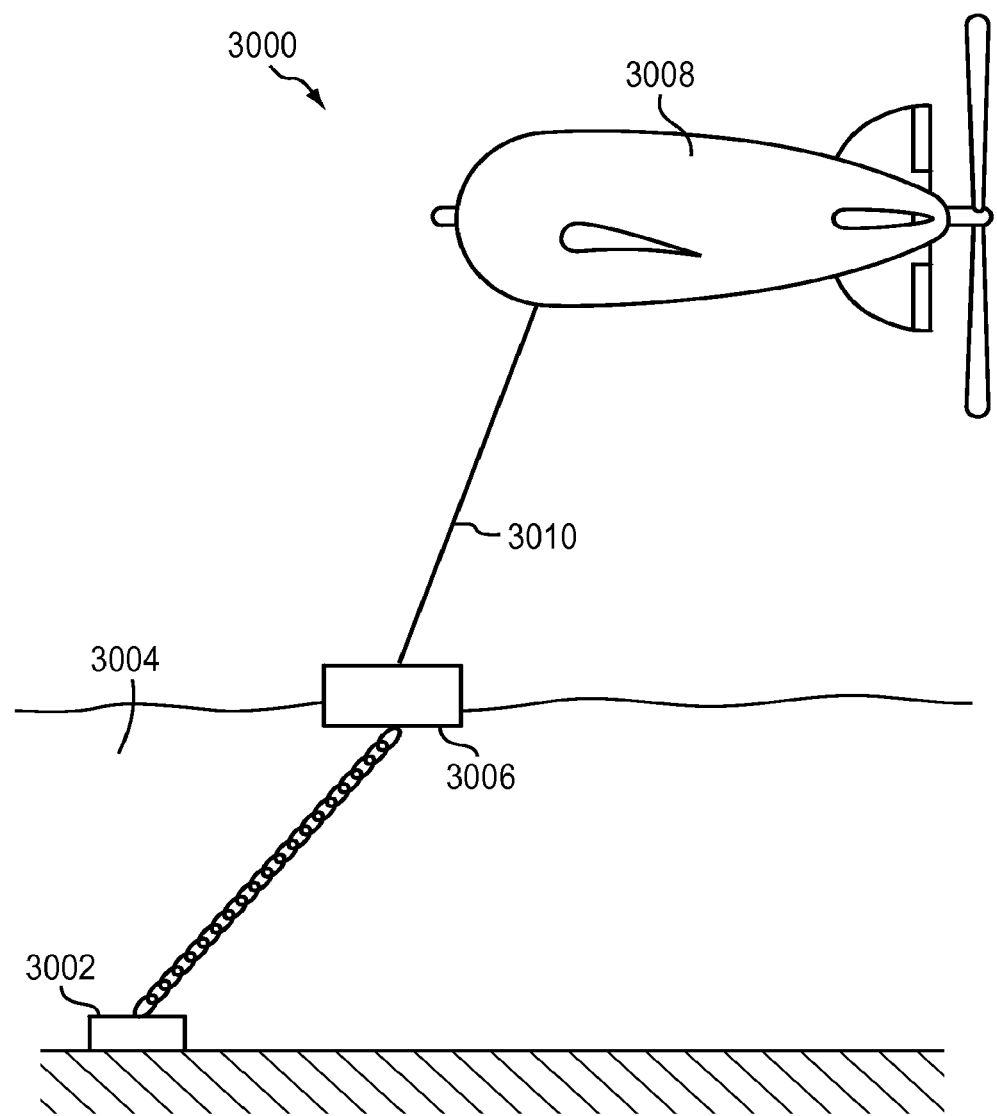

FIG. 30 illustrates one embodiment of an off-shore installation 3000. An anchor point 3002 beneath the water 3004 keeps the mounting buoy 3006 from migrating. No deep foundation is required. As with land systems, the LTA system 3008 may be reeled in for servicing. The buoy 3006 may be constructed to provide protection for the LTA system 3008 when it is reeled in during rough weather.

Conventional tower systems are heavy, difficult to transport, challenging and expensive to install, and inconvenient and somewhat unsafe to service and maintain. All these difficulties are avoided with the system 3000 because it simply may be winched down to the ground for convenient servicing. Further, the internal steering means may be employed to create generally neutral buoyancy so that the buoy 3006 has only enough tension on the tether 3010 to maintain control. This approach suggests that mechanical requirements for active deployment and retraction of the tether 3010 are kept within reasonable bounds, even in extreme wind speeds.

An additional feature of the system 3000 is that, by communicating with the LTA system 3008 along the tether 3010, the buoy 3006 may sense its effect on the height and stability of the LTA system 3008. Thus, the buoy 3006, in combination with an automated retraction mechanism, may suitably let out or retract the tether 3006 in order to compensate for motion caused by, e.g., waves or tides.

Given the need to keep a wind-energy-conversion system aloft for long periods of time, as well as the tendency for lifting gas to leak out of the LTA volume, it is a further goal of embodiments of this invention to compensate for such leakage by providing in-situ gas production or by feeding gas in from the ground through the tether 3010. Helium is a limited resource and has some significant expense. In addition, there is not a convenient means of extracting helium from the atmosphere. It is better to realize that an isolated, unmanned wind-energy-conversion system may be filled with hydrogen, or with a mixture of hydrogen and air. Hydrogen may be produced on-board by electrolyzing water from a stored water supply. Alternatively, water may be extracted from the atmosphere using a small, lightweight condenser, and the condensed water may then be electrolyzed into hydrogen and oxygen. Hydrogen produced therein may be used to fill the LTA volume; oxygen is discarded.

Figure 31A:
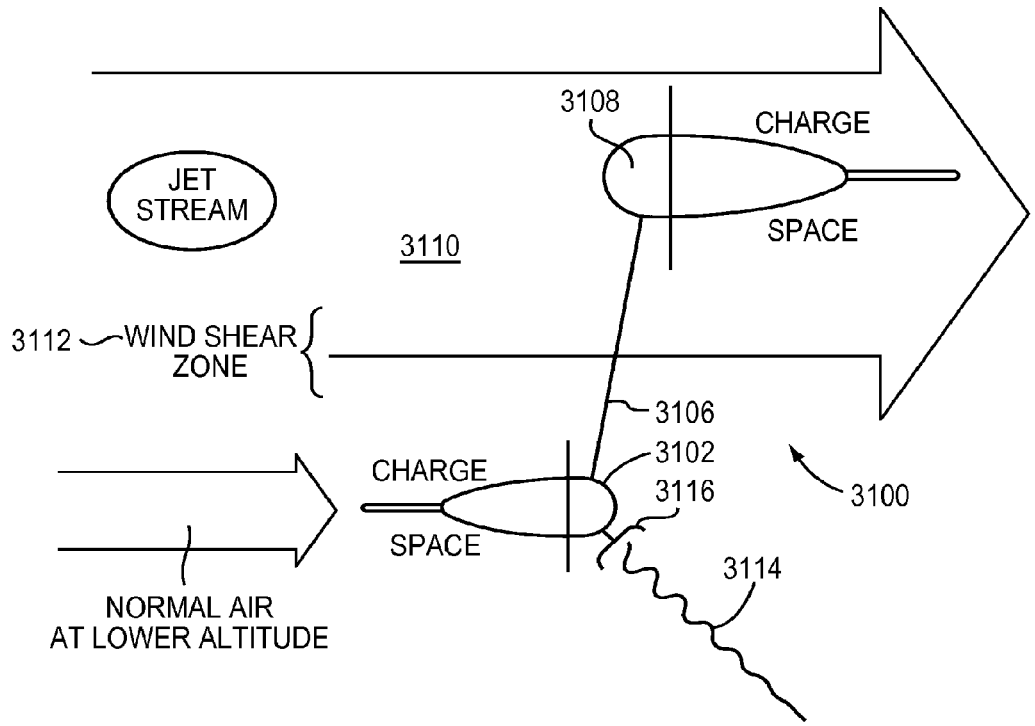
FIGS. 31A-31B illustrate a wind-shear-based airfoil-mounted EHD system in accordance with one embodiment of the invention.

FIG. 31A illustrates an EHD system 3100 that uses wind shear to harvest wind energy. Wind shear is defined as one layer of wind having a different velocity than that of an adjacent, second layer. The system 3100 employs an air anchor 3102 disposed in a first wind layer 3104 that is attached, via a cable 3106, to an LTA/EDA system 3108 disposed in a second wind layer 3110. The velocities of the winds in the two layers 3104, 3110 are assumed to be different. In one embodiment, the second wind layer 3110 is the jet stream. More than one anchor 3102 may be used. The wind shear zone 3112 may enable the use of an air anchor because the lower air is so much slower than the upper air. Captured energy 3114 may be transmitted to the ground using a microwave transmitter 3116. Both the anchor 3102 and the EHD/LTA system 3108 may generate power because both are moving with respect to their wind resources.

Figure 31B:
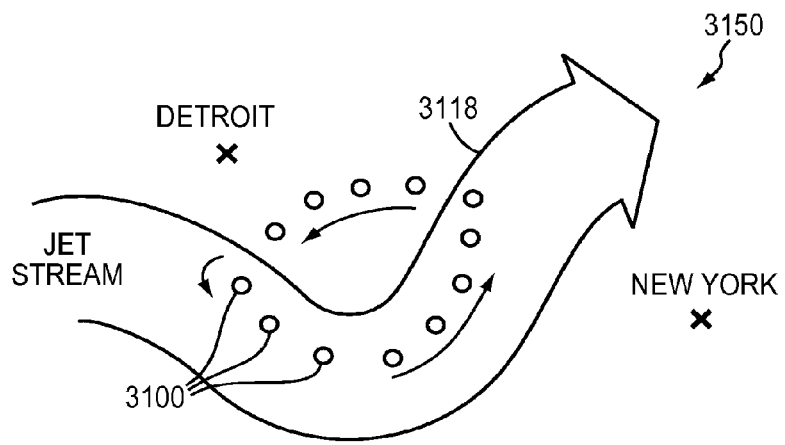

FIG. 31B illustrates a high-altitude view of a continent-sized collection system 3150 composed of numerous mobile EHD/LTA units 3100. Detroit and New York are shown for scale. A unit 2700 entrained in a high-altitude wind current 3110, such as the jet stream, is carried along until it hits a suitable loop back point 3118. Here, the EHD/LTA system 3100 may exit the jet stream 3110 and return to a suitable entry point 3120, whereby the cycle may be repeated. Multiple units may be employed in a continuous loop.

Powering an EHD/LTA unit 3100 from the exit 3118 to the entry point 3120 may be accomplished by any of several means. For example, it may be towed by an aircraft or it may be powered by a thruster. A thruster may be a propeller, a jet, or even an ion drive.

Embodiments of the present invention also encompass water-based energy systems. The use of a working fluid to separate charged particles in a work-capturing electrostatic field may also be applied to more viscous fluids such as water. A charge may be attached to a particle in much the same way as it is attached to a water droplet. A positively charged particle will be attracted to its negative source, and the working fluid will carry it away. Such a hydro-power application includes a means for creating a positive and negative charge pair, and a means for placing one charge (or collection of them) on one carrier while the other is left behind. As more charges leave on the carriers, more opposing charges are left behind. More charge buildup results in a stronger and stronger electrostatic field. To extract energy, excess charge is bled off through a load. Unlike air, which is an excellent insulator, water with even a small amount of dissolved solids or impurities has some level of conductivity. Free charge will flow through water like current through a wire. Charge bound to a particle is able to be carried away by a current.

Because charged particle density can be fully controlled, even low pressure heads such as that which can be found in un-dammed rivers and streams may be used to push charge. Ocean currents, waves, tides, and streams with low head may also be employed. Clearly, fluid systems with large working head will suffice as well.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive and the various structures and functional features of the various embodiments may be combined in various combinations and permutations. All such embodiments are to be considered as parts of the inventive contribution.

What is claimed is:

1. A system for energy extraction from a fluid stream comprising:
   an emitter that emits a charged particle of a first polarity into the fluid stream;
   a sensor that monitors an ambient environmental condition; and
   a controller that adjusts a system parameter to increase energy extraction efficiency in response to a change in the ambient environmental condition.

2. The system of claim 1, further comprising:
   a downstream collector that collects the charged particle; and
   a load electrically connected between the emitter and the downstream collector.

3. The system of claim 1, wherein the monitored ambient environmental condition is ambient wind speed.

4. The system of claim 1, wherein the changed system parameter is an applied electric field strength.

5. The system of claim 4, wherein the system further comprises an upstream collector biased at an electric potential, the electric potential inducing the electric field, wherein the emitter is configured to emit the charged particle into the fluid stream, fluid stream drag on the particle at least partially opposing electric field drag on the charged particle.

6. The system of claim 4, wherein the emitter induces the electric field.

7. The system of claim 1, wherein the fluid stream comprises a liquid stream.

8. The system of claim 1, wherein the charged particles comprise charged droplets of working liquid.

9. The system of claim 8, wherein the emitter comprises a nozzle configured to form a Taylor cone.

10. The system of claim 9, wherein the nozzle is arranged parallel to a gravity vector.

11. The system of claim 9, wherein the nozzle comprises an electrospray nozzle.

12. A method for energy extraction from a fluid stream, comprising:
    emitting charged particles of a first polarity into the fluid stream;
    monitoring an environmental parameter;
    changing a system parameter in response to changes in the environmental parameter.

13. The method of claim 12, wherein the changed system parameter is at least one of a particle parameter and an applied electric field parameter.

14. The method of claim 13, wherein the changed particle parameter comprises charge per particle.

15. The method of claim 13, wherein the changed electric field parameter comprises electric field strength.

16. The method of claim 12, further comprising: inducing an electric field, fluid stream drag on the charged particles at least partially opposed by electric field drag on the charged particles.

17. The method of claim 16, further comprising collecting the emitted charged particles at a downstream collector.

18. The method of claim 17, wherein changing a system parameter comprises changing a distance between the downstream collector and a charged particle emitter.

19. The method of claim 17, further comprising extracting power from charged particle displacement.

20. The method of claim 16, wherein emitting the charged particles induces the electric field.

21. The method of claim 12, wherein the charged particles comprise droplets.

22. The method of claim 21, wherein emitting charged particles comprises forming the droplets through electrospray.

23. The method of claim 12, wherein emitting charged particles comprises charging the particles substantially near the Rayleigh limit for the particle.

24. The method of claim 12, wherein changing a charged particle parameter comprises automatically adjusting the charged particle parameter in real-time.

25. The method of claim 12, wherein monitoring an environmental parameter comprises monitoring ambient wind speed.

* * * * *